(12) United States Patent
Mace et al.

(10) Patent No.: US 8,307,138 B2
(45) Date of Patent: Nov. 6, 2012

(54) APPARATUS AND METHOD FOR CONTROLLING ISSUING OF TRANSACTION REQUESTS

(75) Inventors: Timothy Charles Mace, Suffolk (GB); Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 297 days.

(21) Appl. No.: 12/805,100

(22) Filed: Jul. 12, 2010

(65) Prior Publication Data

US 2012/0011291 A1 Jan. 12, 2012

(51) Int. Cl.
*G06F 13/00* (2006.01)
(52) U.S. Cl. .......... 710/110; 710/107; 710/113; 710/305
(58) Field of Classification Search .................. 710/107, 710/110, 113, 120, 305, 310
See application file for complete search history.

(56) References Cited

U.S. PATENT DOCUMENTS

| | | | | |
|---|---|---|---|---|
| 5,944,805 A | * | 8/1999 | Ricks et al. | 710/107 |
| 2002/0161978 A1 | * | 10/2002 | Apostol et al. | 711/151 |
| 2006/0123178 A1 | * | 6/2006 | Lueck et al. | 710/306 |

* cited by examiner

*Primary Examiner* — Glenn A Auve

(74) *Attorney, Agent, or Firm* — Nixon & Vanderhye P.C.

(57) ABSTRACT

Transaction requests requesting a service from the slave device are received from a master device at a transaction interface. The transaction requests are selectively issued to the bus system under control of an issue control circuit. A target outstanding transaction value N.x is received at a control interface. The target outstanding transaction value has an integer portion N and a fractional portion x. The issue control circuit controls the transaction interface to issue the transaction requests to the bus system in dependence upon the target outstanding transaction value so that a time averaged number of outstanding transaction requests corresponds to the target outstanding transaction value.

24 Claims, 13 Drawing Sheets

$$\lambda = \lambda_1 + \lambda_2 + \lambda_3 = \frac{E(L_1)}{E(S)} + \frac{E(L_2)}{E(S)} + \frac{E(L_3)}{E(S)}$$

$$= \frac{E(L)}{E(S)}$$

$$\text{time averaged OT} = (N+1) \times \frac{48}{64} + N \times \frac{16}{64}$$

$$= N + \frac{48}{64} = \underline{0.75}$$

APPARATUS AND METHOD FOR CONTROLLING ISSUING OF TRANSACTION REQUESTS

BACKGROUND OF THE INVENTION

1. Field of the Invention

The present invention relates to the field of bus systems. More particularly, the invention relates to controlling issuing of transaction requests to a bus system.

2. Description of the Prior Art

A bus system may be used to connect together master devices and slave devices. A master device can request a service from a slave device by issuing a transaction request to the bus system. The bus system then delivers the transaction request to the slave device, and the slave device performs the requested service and sends a response to the master device via the bus system.

When there are multiple master devices competing for use of the bus system or competing for use of the same slave device, an allocation mechanism may be needed to determine when each master device gains use of the bus system or slave device. For example, a round robin mechanism can be used to allocate fixed slots to each of the master devices so that each master device may in turn access the bus system or the slave device. In this way, each master device has an equal chance of accessing the bus system or the slave device.

However, it may be desirable for one master device to gain access to the bus system more frequently than another master device. For example, one master device may generate transaction requests at a higher rate than the other master device and so may require use of the bus system or a slave device more often. It is possible to use a weighted round robin scheme where one master device receives more time slots than another master device and so is able to access the bus system and the slave devices more frequently. However, such a scheme may not provide the desired distribution of bus/slave bandwidth among the master devices. Also, when the bus system is a hierarchical bus system having at least two levels of bus interconnects, each interconnect being connected to one or more master or slave devices, then the weighted round robin scheme is more difficult to manage because the particular way in which the interconnects couple the master and slave devices together may make it difficult to achieve certain allocations of bus/slave bandwidth. The present technique seeks to provide an improved technique for allocating bandwidth on the bus system.

SUMMARY OF THE INVENTION

Viewed from one aspect the present invention provides an apparatus for controlling issuing of transaction requests to a bus system, said apparatus comprising:

a transaction interface configured to receive said transaction requests from a master device and to selectively issue said transaction requests to said bus system, said transaction requests requesting a service from a slave device, an outstanding transaction request being a transaction request that has been issued to said bus system and is awaiting servicing by said slave device;

a control interface configured to receive a target outstanding transaction value N.x having an integer portion N and a fractional portion x; and an issue control circuit configured to control said transaction interface to issue said transaction requests to said bus system in dependence on said target outstanding transaction value such that a time averaged number of outstanding transaction requests corresponds to said target outstanding transaction value N.x.

The amount of bus or slave device bandwidth that is occupied by transaction requests from a particular master device is dependent upon the rate at which transaction requests are issued from that master device to the bus system. Therefore, by controlling the issuing of the transaction requests from the master device to the bus system, the bus/slave bandwidth associated with the master device can be regulated.

The present technique uses the number of outstanding transaction requests, that is the number of transaction requests that have been issued to the bus system and are awaiting servicing by the slave device, as a measure of the bus bandwidth occupied by the master device. The higher the number of outstanding transaction requests associated with the master device, the higher the proportion of the bus/slave bandwidth occupied by that master device (relative to any other master devices which also issue requests to the bus system).

To regulate the number of outstanding transaction requests associated with a master device, the present technique provides an apparatus for controlling the issuing of transaction requests to the bus system. The apparatus comprises a transaction interface which receives a transaction request from a master device, and a control interface that receives a target outstanding transaction value N.x having an integer portion N and a fractional portion x. An issue control circuit is provided to control the transaction interface to issue the transaction request to the bus system in dependence upon the target outstanding transaction value N.x. The issue control circuit controls the issuing of the transaction request such that the time averaged number of outstanding transaction requests corresponds to the target outstanding transaction value N.x. Even though the number of outstanding transaction requests at any particular instant is an integer, the issue control circuit controls the transaction interface to issue the transaction requests at a variable rate so that the number of outstanding transaction requests averages over time to the target outstanding transaction value N.x. Sometimes the number of outstanding transaction requests will be greater than N.x, and at other times the number of outstanding transaction requests will be smaller than N.x, but over time the average number of outstanding transaction requests corresponds to N.x. This is useful because controlling the number of outstanding transaction requests for a particular master device to average to a fractional value enables non-integer ratios between the bus bandwidth allocated to different master devices to be set up. A non-integer ratio may reflect the bandwidth demands of the respective master devices more accurately and efficiently than an integer ratio, and so the present technique enables such demands to be satisfied more precisely than previous techniques which are restricted to integer bandwidth ratios.

In the present application, the integer portion N of the target outstanding transaction value may be any integer greater than, or equal to, zero. The fractional portion x of the target outstanding transaction value may be any value that satisfies 0≦x<1, for example 0, 0.2, 0.5, 0.872849, etc. When x is equal to zero, then the target outstanding transaction value is an integer value, while when x is equal to a non-zero fraction then the target outstanding transaction value is a fractional value. Thus, by inputting the appropriate values of N and x to the control interface the user of the issue control apparatus has the freedom to select any desired fractional or integer target number of outstanding transaction requests.

There are a number of ways of calculating the time averaged number of outstanding transaction requests. In one embodiment, the time averaged number of outstanding transaction requests is time averaged over an active period during which the master device is generating transaction requests. For example, the issue control circuit may regulate the issuing of transaction requests from the master device to the bus system during the active period, but may control the issuing so that periods during which the master device is inactive are not taken into account for the time average.

Alternatively, the time averaged number of outstanding transaction requests may be time averaged over the operation time of the bus system independently of whether the master device is generating transaction requests. For example, when the master device begins to generate transaction requests again following a period of time when the master device did not generate, transaction requests, the issue control circuit will issue the transaction requests to the bus system at a greater rate than would normally achieve the target number of outstanding transactions, so as to ensure that the overall average for both the period when the master device was inactive and the period when the master device was actively generating transaction requests corresponds to the target outstanding transaction value.

Also, the time averaged number of outstanding transaction requests may be time averaged over an averaging cycle which repeats over time, and the issue control circuit controls may control the transaction interface to issue the transaction requests such that a current number of outstanding transaction requests is N+1 for a fraction x of the averaging cycle and the current number of outstanding transaction requests is N for a fraction 1−x of the averaging cycle. Hence, over time the current number of outstanding transaction requests oscillates between N+1 and N so that the time averaged number of outstanding transaction requests is N.x. The averaging cycle may comprise a single period when the current number of outstanding transaction requests is N+1 and a single period when the current number of outstanding transaction requests is N. Alternatively, the averaging cycle may in some instances comprise multiple periods of N+1 and N outstanding transaction requests, where the total length of the periods of N+1 outstanding transaction requests make up the fraction x of the averaging cycle and the total length of the periods of N outstanding transaction requests make up the fraction 1−x of the averaging cycle. Since $(N+1)*x+N*(1-x)=N+x=N.x$, the time averaged number of outstanding transaction requests, averaged over the averaging cycle, corresponds to the target outstanding transaction value.

The issue control circuit may comprise an accumulator configured to accumulate an accumulation value in dependence on a current number of outstanding transaction requests and the target outstanding transaction value N.x; and the issue control circuit may be configured to issue the transaction requests in dependence on the accumulation value and the current number of outstanding transaction requests. The accumulator provides an efficient way of controlling when to issue the transaction requests to the bus system.

In an embodiment, the apparatus and the bus system may be clocked with a clock signal defining processing cycles. The accumulator may be configured to increment the accumulation value by an amount proportional to 1−x for a processing cycle when the current number of outstanding transaction requests is greater than N. Also, the accumulator may be configured to decrement the accumulation value by an amount proportional to x for a processing cycle when the current number of outstanding transaction requests is equal to, or fewer than, N. The issue control circuit may be configured to control the transaction interface to issue an additional transaction request to the bus system when: (a) said current number of outstanding transaction requests is fewer than N; or (b) said current number of outstanding transaction requests is N and said accumulation value is one of: (i) decremented beyond a predetermined threshold value and (ii) equal to said predetermined threshold value.

The accumulator accumulates an accumulation value over a number of processing cycles in dependence on the current number of outstanding transaction requests. The issue control circuit controls when the transaction interface issues the additional transaction request to the bus system in dependence upon the accumulation value. The additional transaction request is input to a bus system and becomes an outstanding transaction request in addition to any other previously existing outstanding transaction requests.

The accumulator modifies the accumulation value by an amount per processing cycle that is dependent on the target outstanding transaction value N.x and the current number of outstanding transaction requests. In a cycle in which the current number of transaction requests is greater than N, the accumulator increments the accumulation value by an amount proportional to 1−x. In a processing cycle when the current number of transaction requests is N or fewer, the accumulator decrements the accumulation value by an amount proportional to x. The issue control circuit controls the transaction interface to issue an additional transaction request when either the current number of transaction request is fewer than N (indicating that an additional transaction request should be issued to raise the number of outstanding transaction requests to be nearer to the target of N.x), or the current number of outstanding transaction requests is N and the accumulation value is one of decremented beyond a predetermined threshold value and equal to the predetermined threshold value.

By issuing an additional transaction at such times, the accumulation value is incremented and decremented successively over a repeating cycle and the current number of outstanding transaction requests will typically oscillate between N and N+1. The increment step amount proportional to 1−x and the decrement step amount proportional to x ensures that the current number of outstanding transaction requests will be N+1 for a fraction x of the time and will be N for a fraction 1−x of the time, thus averaging to the target of N.x. Hence, the accumulator helps to regulate the issuing of the transaction requests so that the target outstanding transaction value is satisfied.

The terms "increment" and "decrement" are used herein to indicate adjustments to the accumulation value of opposite signs. For example, if incrementing means adding a value to the accumulation value, then decrementing means subtracting a value from the accumulation value. Similarly, if incrementing means subtracting a value from the accumulation value, then decrementing means adding a value to the accumulation value. While for clarity the embodiments described herein will generally use "increment" to mean adding and "decrement" to mean subtracting, it should be appreciated that the opposite embodiment is equally valid and may be achieved simply by reversing the signs of the increment and decrement.

The predetermined threshold value may be set to any value. However, a convenient threshold value is zero. In the embodiment where "incrementing" is adding and "decrementing" is subtracting, the issue control circuit controls an additional transaction request to be issued to the bus system when the current number of outstanding transaction requests is N and the accumulation value becomes zero or negative. This is convenient since a comparison with zero is simple to implement, while a negative value of the accumulation value can be detected easily from the sign bit (typically the most significant bit of a binary value), for example.

After the accumulation value has been decremented beyond the predetermined threshold value, the accumulator may be configured to process the accumulation value in different ways.

In one embodiment, the accumulator may be configured to prevent the accumulation value being decremented beyond the predetermined threshold value. For example, in the embodiment in which the threshold value is zero and "decrementing" means subtracting, the accumulator could cap the accumulation value to zero such that the accumulation value cannot become negative. This can simplify the configuration of the accumulator since there is no need for circuitry for handling negative values.

However, accuracy can be improved if the accumulation is configured to allow the accumulation value to be decremented beyond the predetermined threshold for one processing cycle, and to prevent the accumulation value being decremented in processing cycles following the one processing cycle until after the accumulation value has been incremented beyond the threshold. For example, in an embodiment where the threshold is zero and "decrementing" means subtracting, then the accumulation value may become negative for one processing cycle but may then be held at that negative value so that the accumulation value is not allowed to be decremented further even if the current number of outstanding transactions continues to be equal to, or fewer than, N. The accumulator may then wait for further transaction requests to be issued, and only after a further transaction request has been issued and the accumulation value has been incremented beyond the threshold may the accumulation value be decremented again.

This technique provides an accurate correspondence between the target outstanding transaction value N.x and the time averaged number of outstanding transaction requests, because allowing the accumulation value to be decremented beyond the threshold for one processing cycle enables small displacements of the time average from the target, which are caused by discrete decrement step sizes of the accumulation value overshooting the threshold by different amounts depending on the past history of incrementing/decrementing, to cancel each other out over time. Moreover, by preventing further decrementing of the accumulation value after the processing cycle in which the accumulation value goes beyond the threshold, the accumulator can ensure that periods of inactivity during which no further transaction requests are generated by the master device do not affect the overall time averaged number of outstanding transaction requests for that master device.

On the other hand, the accumulator may also be configured to allow the accumulation value to be decremented beyond the predetermined threshold and to continue allowing the accumulation value to be decremented in following processing cycles when the current number of outstanding transaction requests continues to be equal to, or fewer than, N. In this example, a period of inactivity during which a particular master device is not generating transaction requests is factored into the time averaged number of outstanding transaction requests. This is because the accumulation value continues to be decremented as long as the current number of outstanding transaction requests is N or fewer, even if no further transactions are generated. Hence, when another transaction request is issued then several cycles of incrementing will be required to return the accumulation value to the threshold value. This means that there will be a number of cycles during which the current number of outstanding transaction requests for the master device is greater than N to outweigh the number of cycles during which the current number of outstanding transaction requests was equal to, or fewer than, N. Hence, the time average value takes into account the period in which the master device was not generating transaction requests and averages to the target value N.x over the entire operation time of the system.

mentioned above, the accumulator increments or decrements the accumulation value by an amount dependent upon the fractional part x of the target outstanding transaction request value. The accumulation value may therefore have both an integer portion and a fractional portion. While in an embodiment the accumulator may calculate the integer portion and fractional portion of the accumulation value together, the timing of a synthesised embodiment (synthesis timing) can be improved by separating the fractional and integer accumulators so that the accumulator comprises an integer accumulator for accumulating an integer portion of the accumulation value and a fractional accumulator for accumulating a fractional portion of the accumulation value.

The accumulator increments the accumulation value if the current number of outstanding transaction requests is greater than N and decrements the accumulation value if the current number of outstanding transaction requests is equal to, or fewer than, N. However, in an embodiment the accumulator may be configured to generate both an incremented accumulation value and a decremented accumulation value in the same processing cycle. The accumulator can then update the accumulation value according to one of the incremented accumulation value and the decremented accumulation value that is selected in dependence upon the current number of outstanding transaction requests. By calculating the incremented and decremented accumulation values in parallel and then selecting one of these values in dependence on the current number of outstanding transaction requests, the processing time for updating the accumulation value is reduced.

The target outstanding transaction value has an integer portion N and a fractional portion x. If the fractional portion x has a value of zero, then the issue control circuit may be configured to disable the accumulator and to control the transaction interface to issue an additional transaction request to the bus system when the current number of outstanding transaction requests is fewer than N. In this case, the target outstanding transaction value is an integer N and so the accumulator is not required since the number of outstanding transaction requests can be regulated by issuing another transaction request each time the current number of outstanding transaction requests is fewer than N, in order to achieve the target number of outstanding transaction requests of N. The accumulator may be disabled in a number of ways. One option would be to provide a logic gate which clamps the output of the accumulator to a fixed value when the accumulator is disabled. Circuitry downstream from the accumulator (e.g. a circuit for controlling whether the transaction interface can issue an additional transaction request) could also be controlled to be non-responsive to the accumulator output when the fractional portion x has, a value of zero.

The apparatus of the present technique is useful for controlling the rate at which transaction requests are issued from a master device to a bus system, and hence the proportion of the bandwidth of the bus system and slave device which is used by the master device. However, in some instances it may be desired to disable the issue control. In one embodiment, the apparatus comprises an enable interface for receiving an enable signal, and the enable signal has an enable state and a disable state. When the enable signal is the enable state, then the issue control circuitry may control the transaction interface to issue transaction requests in dependence upon the target outstanding transaction value, for example as explained above. On the other hand, if the enable signal is in the disable state, then the issue control circuitry may control the transaction interface to issue transaction requests independently of the target outstanding transaction value. For example, when the enable signal is in the disable state then the transaction interface could issue the transaction requests at the same rate at which the master device generates the transaction requests, or at a rate determined by the master device or transaction interface.

The transaction requests may comprise a plurality of types of transaction requests, and the control interface may be configured to receive a plurality of target outstanding transaction values N.x for the plurality of types of transaction requests. The issue control circuit may be configured to control the transaction interface to issue the transaction requests in dependence on the respective plurality of target outstanding transaction values such that a time averaged number of outstanding transaction requests for a type of transaction request corresponds to the target outstanding transaction value for the type. For example, if the master device is a graphics processor, then the graphics processor may generate transaction requests at different rates depending on whether the transaction requests relate to one type of graphics processing or another type. In such a case, then it can be useful to set a higher target number of outstanding transaction values for the type of transaction request requiring the most bandwidth. The respective types of transaction request may be associated with different type identifiers, so that the issue control circuit is responsive to the type identifier of a transaction request to control the issuing of the transaction request in accordance with the target outstanding transaction value corresponding to the type identified by the type identifier.

Also, the transaction requests may comprise read transaction requests and write transaction requests. While it is possible to manage the read transaction requests and write transaction requests separately as different types of transaction requests each having a separate target outstanding transaction value, in an embodiment the target outstanding transaction value for the read and write transaction request is a combined target outstanding transaction value that indicates a target for the combined number of outstanding read transaction requests and outstanding write transaction requests.

When the read and write transaction requests are treated together in this way, the issue control circuit may comprise an arbiter which is responsive to the current number of outstanding transaction requests being equal to N−1 to select one of a pending read transaction and a pending write transaction for issue to the bus system. When the current number of outstanding transaction requests is equal to N−1 then there is room for one additional transaction request to be issued and so the arbiter uses a selection criterion to select one of the pending read and write transaction requests. The selection criterion could for example favour write transactions over read transactions or vice versa, or could select a read or write transaction at random, or could be a round robin type scheme which selects the type of transaction request that has least recently been issued, for example.

In an embodiment, the apparatus may comprise a plurality of transaction interfaces configured to receive transaction requests from a corresponding plurality of master devices and to selectively issue said transaction requests to said bus system; wherein:

said control interface is configured to receive a plurality of target outstanding transaction values N.x for said plurality of master devices; and said apparatus comprises a plurality of issue control circuits configured to control said plurality of transaction interfaces to issue transaction requests in dependence on said respective plurality of target outstanding transaction values such that the time averaged number of outstanding transaction requests for a master device corresponds to the target outstanding transaction value N.x for said master device.

By providing plural issue control circuits for controlling the issuing of transaction requests from corresponding master devices in accordance with a respective plurality of target outstanding transaction values N.x, the present technique enables the ratio between the time averaged number of outstanding transaction requests for different master devices to be set to a non-integer ratio.

For example, one master device may require frequent access to the bus system and so is allowed 2.0 outstanding transaction requests in the system at a time. Another master device may generate transaction requests very infrequently and is allowed an average of 0.01 outstanding transaction requests in the bus system. Another master device may be associated with a target outstanding transaction value of 1.2, for example. As an integer ratio, the required bandwidth allocation would be 200:1:120, whereas as a fractional ratio the allocation is 2.0:0.01:1.2.

If only integer numbers of outstanding transaction requests could be set for a particular master device then the bus system would need to handle a very large number of outstanding transaction requests to satisfy this ratio, since the respective master devices would require 200, 1, and 120 outstanding transaction requests at any particular instant. This would mean that a transaction queue provided within the bus system or the slave device for maintaining outstanding transaction requests would require space for at least 321 transaction requests in order to provide the desired bandwidth allocation. This would require a large amount of processing resource and would be inefficient.

The present technique realises that the number of outstanding transaction requests within the bus system can be greatly reduced by enabling the target outstanding transaction values to be set to a fractional number and controlling the time averaged number of outstanding transaction requests to correspond to the target. This means that non-integer ratios such as 2.0:0.01:1.2 can be implemented without requiring the bus system to handle many outstanding transaction requests. In the above example, for 99% of the time the master device having a target of 0.01 will have 0 transaction requests outstanding in the system, but for 1% of the time, the number of outstanding transaction requests associated with that master device would be 1. In this way, the time averaged of the number of outstanding transaction requests for the master is 0.01. Similarly, the master device having a target of 1.2 may have 1 outstanding transaction request for 80% of the time, and 2 outstanding transaction requests for 20% of the time, averaging to 1.2 transaction requests over time. The master device having the target of 2.0 may have 2 outstanding transaction requests all of the time. Thus, the total queue length (including transaction requests from all master devices) at any particular instant is 3, 4 or 5, but when averaged over time the desired fractional ratios of outstanding numbers of transaction requests are satisfied. Hence, by enabling a fractional target number of outstanding transaction requests, the desired ratios of outstanding transaction requests can be satisfied while the total number of outstanding transaction requests within a bus system at any particular instant can be greatly reduced compared to a system where only integer targets are possible.

While the apparatus of the present technique may be provided separately from the bus system, in an embodiment the apparatus is part of an interconnect within the bus system. This is convenient since the interconnect typically has access to the current number of outstanding transaction values and so the apparatus within the interconnect can use the current number of outstanding transaction values to control the issuing of transaction requests.

The target outstanding transaction value may be reprogrammable by at least one of a master device and an external device. For example, if a master device determines that it is generating transaction requests at a higher rate than the rate at which its transaction requests are being serviced by the bus system and/or slave device, then the master device could reprogram the target outstanding transaction value to allocate itself a higher proportion of the bus bandwidth. For example, a graphics processor may find that transaction requests are not being serviced before the end of a frame period, thus preventing the frame being displayed properly. In this case the target outstanding transaction value could be increased to ensure that the processing for displaying the frame is complete before the end of the frame period. Alternatively, if the processor is processing the frame very quickly then the target outstanding transaction value could be reduced. Also, an external device such as a processor could modify the target outstanding transaction value. The issue control circuit may then respond to the modified target value to control the rate at which the transaction requests are issued so that after an initial adjustment period, the time averaged number of outstanding transaction requests corresponds to the modified target outstanding transaction value.

Viewed from a further aspect the present technique provides an apparatus comprising:

a plurality of master devices configured to generate transaction requests;

at least one slave device configured to perform a service in response to said transaction requests;

a bus system coupled to said plurality of master devices and said at least one slave device, at least one of said bus system and said at least one slave device comprising at least one transaction queue for queuing outstanding transaction requests, an outstanding transaction request being a transaction request that has been issued to said bus system and is awaiting servicing by said at least one slave device;

a plurality of transaction interfaces each configured to receive said transaction requests from a corresponding one of said master devices and to selectively issue said transaction requests to said bus system;

a control interface configured to receive at least one target outstanding transaction value N.x for at least one master device, said target outstanding transaction value having an integer portion N and a fractional portion x; and at least one issue control circuit configured to control at least one of said transaction interfaces to issue said transaction requests to said bus system in dependence on said at least one target outstanding transaction value such that a time averaged number of outstanding transaction requests for said at least one master device corresponds to said target outstanding transaction value N.x for said at least one master device.

Not every master device needs to have a corresponding issue control circuit. In an apparatus comprising a plurality of master devices and a bus system, at least one master device may be provided with an issue control circuit which controls a corresponding transaction interface to issue transaction requests to the bus system in dependence on a corresponding target outstanding transaction value. If desired another master device may not have a corresponding issue control circuit. Nevertheless, fractional ratios between the time averaged number of outstanding transaction requests from the respective master devices can be set up by allowing the master device not having an issue control circuit to issue transaction requests at a given rate, and adjusting the target outstanding transaction value N.x for the master device having a corresponding issue control circuit according to the desired ratio.

Viewed from another aspect the present invention provides an apparatus for controlling issuing of transaction requests to a bus system means, said apparatus comprising:

transaction interface means for receiving said transaction requests from a master device means and for selectively issuing said transaction requests to said bus system means, said transaction requests requesting a service from a slave device means, an outstanding transaction request being a transaction request that has been issued to said bus system means and is awaiting servicing by said slave device means;

control interface means for receiving a target outstanding transaction value N.x having an integer portion N and a fractional portion x; and issue control means for controlling said transaction interface to issue said transaction requests to said bus system means in dependence on said target outstanding transaction value such that a time averaged number of outstanding transaction requests corresponds to said target outstanding transaction value N.x.

Viewed from yet another aspect, the present invention provides an apparatus comprising:

a plurality of master device means for generating transaction requests;

at least one slave device means for performing a service in response to said transaction requests;

bus system means, coupled to said plurality of master device means and said at least one slave device means, for transferring said transaction requests from said master device means to said slave device means, at least one of said bus system means and said at least one slave device means comprising at least one transaction queue means for queuing outstanding transaction requests, an outstanding transaction request being a transaction request that has been issued to said bus system means and is awaiting servicing by said at least one slave device means;

a plurality of transaction interface means for receiving said transaction requests from a corresponding one of said master device means and to selectively issue said transaction requests to said bus system means;

control interface means for receiving at least one target outstanding transaction value N.x for at least one master device means, said target outstanding transaction value having an integer portion N and a fractional portion x; and at least one issue control means for controlling at least one of said transaction interface means to issue said transaction requests to said bus system means in dependence on said at least one target outstanding transaction value such that a time averaged number of outstanding transaction requests for said at least one master device means corresponds to said target outstanding transaction value N.x for said at least one master device means.

Viewed from another aspect, the present invention provides a method for controlling issuing of transaction requests to a bus system, said method comprising:

receiving transaction requests from a master device for issue to said bus system, said transaction requests requesting a service from a slave device, an outstanding transaction request being a transaction request that has been issued to said bus system and is awaiting servicing by said slave device;

receiving a target outstanding transaction value N.x having an integer portion N and a fractional portion x; and selectively issuing said transaction requests to said bus system in dependence on said target outstanding transaction value such that a time averaged number of outstanding transaction requests corresponds to said target transaction value N.x.

The above, and other objects, features and advantages of this invention will be apparent from the following detailed description of illustrative embodiments which is to be read in connection with the accompanying drawings.

DESCRIPTION OF THE EMBODIMENTS

Figure 1:
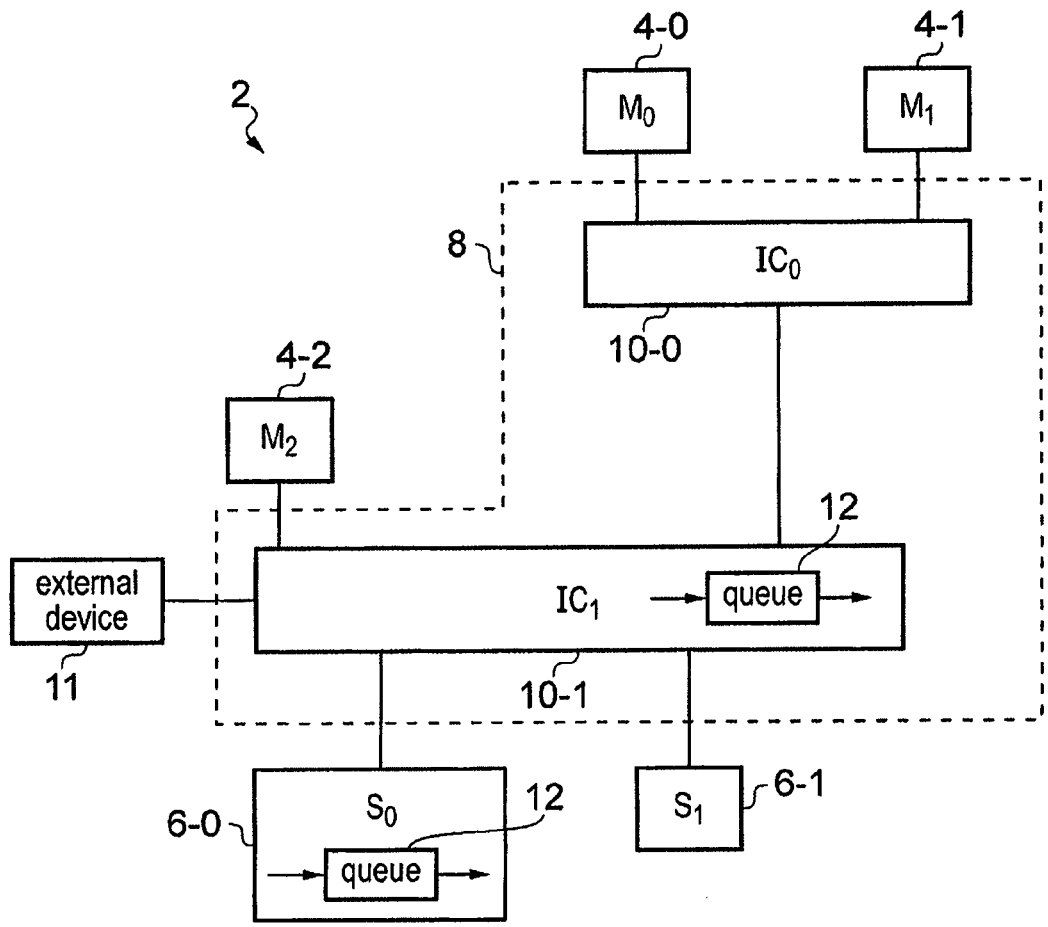
FIG. 1 schematically illustrates a bus system for coupling master devices and slave devices.

FIG. 1 schematically illustrates an apparatus 2 for processing data. The apparatus 2 comprises several master devices 4 which are coupled to slave devices 6 via a bus system 8. The bus system comprises a number of interconnects 10 for routing transaction requests between the master devices 4 and the slave devices 6. In the embodiment of FIG. 1, the bus system 8 is a hierarchical bus system comprising two levels of interconnect 10-0, 10-1. The interconnect 10-0 is coupled to the master devices 4-0, 4-1, and routes transaction requests from one of the master devices 4-0, 4-1 to the interconnect 10-1. The interconnect 10-1 is coupled to the master device 4-2 and routes transaction requests from the master device 4-2 or from the interconnect 10-0 to one of the slave devices 6-0, 6-1. While FIG. 1 has been illustrated with bus system 8 comprising two levels of interconnect 10, it will be appreciated that the bus system 8 may comprise more or fewer interconnects 10. Optionally, an external device 11 (e.g. an external processor or debug controller) may provide information (e.g. control or debug information) to the bus system 8.

When a master device 4 requires a service from one of the slave devices 6, then the master device generates a transaction request and sends the transaction request to the bus system 8. The bus system 8 determines when transaction requests generated by the master device are allowed to be issued through the bus system 8. At least one of the bus system 8 and at least one slave device 6 comprises a transaction queue 12 for queuing pending transaction requests which have been issued to the bus system 8 but are still awaiting servicing by one of the slave devices 6. For example, in FIG. 1 the interconnect 10-1 or the slave device 6-0 can have a transaction queue 12 for queuing the transaction requests. For example, the slave device 6-0 can be a memory controller which queues transaction requests in the transaction queue 12 while awaiting a memory access. Alternatively, one of the slave devices, for example device 6-1, may not have its own transaction queue and so instead the bus system 8 queues the transaction requests for the slave device 6-1 in a transaction queue 12 within the interconnect 10-1.

The bus system 8 and slave devices 6 have a finite bandwidth available for use by their respective master devices 4. While this bandwidth could be divided evenly amongst the master devices 4, in some situations one master device may require more bandwidth than the other master devices. For example, master device 4-0 may generate transaction requests at 50 times the rate at which master device 4-2 requires access to the bus and slave device and 3 times as often as the master device 4-1 requires access.

Figure 2:
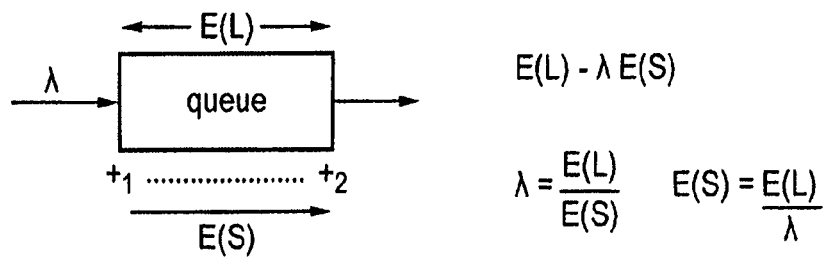
FIG. 2 illustrates the relationship between a rate at which transactions are input to a transaction queue, an expected queue length, and an expected average length of time for which a transaction request resides in the queue.

FIG. 2 schematically illustrates a principle which can be used to control the amount of bandwidth allocated to a particular master device. For any queue of items (e.g. transaction requests), the expected queue length of E(L) outstanding items, the input rate $\lambda$ at which items are added to the queue, and the expected queue occupation time E(S) with which an individual item is expected on average to reside within the queue, are related by Little's law $E(L)=\lambda E(S)$. That is, the expected number of outstanding items within the queue is equal to the rate at which items are added to the queue multiplied by the expected average time for which an item resides in the queue before being processed.

Figure 3:
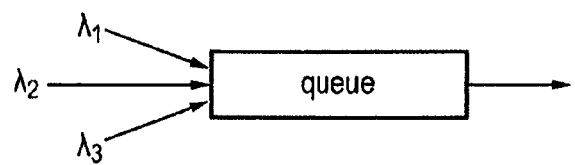
FIG. 3 illustrates an example where transaction requests from multiple sources are input to the same transaction queue.

FIG. 3 shows another example of a queue. In this example, items are input to the queue from multiple sources at different rates $\lambda_1, \lambda_2, \lambda_3$. If each item in the queue is processed with the same priority, then the expected occupancy time E(S) for each item is the same regardless of which source inputted the item into the queue. The total input rate $\lambda$ is equal to the sum of the input rate $\lambda_1+\lambda_2+\lambda_3$ and, following Little's law this must equal E(L)/E(S). Since the expected occupation time E(S) is the same for all items then E(L) can also be represented as the sum of the expected queue lengths $E(L_1)$, $E(L_2)$, $E(L_3)$ for each source of items, and so $$\lambda = \lambda_1 + \lambda_2 + \lambda_3 = \frac{E(L_1)}{E(S)} + \frac{E(L_2)}{E(S)} + \frac{E(L_3)}{E(S)} = \frac{E(L)}{E(S)}.$$

Hence, we can see that for each individual input source, the expected queue length for items from that input source is proportional to the input rate for that input source.

Now, if the expected queue length for input source 1 is twice as long as the expected queue length for input source 2, then items in the queue that originated from source 1 will be processed twice as often as items in the queue from input source 2. Accordingly, the expected queue length can be an indication of the queue bandwidth used by a particular input source. Since the expected queue length for a particular input source is directly proportional to the input rate from the source, then a desired amount of queue bandwidth can be allocated to a particular input source by controlling the input rate from that source.

This principle can be used in the apparatus 2 shown in FIG. 1. By providing the bus system 8 with a circuit for controlling the rate at which transaction requests are input from the respective master devices 4 so that the ratio between input rates between respective master devices 4 is a given target ratio, then the transaction queue 12 will include respective numbers of outstanding transactions from the different master devices that correspond to the ratio of input rates. Hence, bandwidth will be allocated between the master devices 4 according to the ratio between the input rates. For example, the master device 4-0 could be controlled to issue transaction requests 3.5 times as frequently as master device 4-1. Accordingly, master device 4-0 will be allocated 3.5 times the number of outstanding transactions within the queue 12 as master device 4-1, and so will occupy 3.5 times the bus/slave bandwidth.

The present technique recognises that it is useful to be able to allocate a fractional amount of bus/slave bandwidth to a master device 4. For example, the ratio between the rates at which the master devices 4 generate transaction requests may not map easily to a whole integer ratio, and allocating bandwidth according to the nearest integer ratio may result in a particular master device 4 either being allocated too much bus bandwidth (thus preventing other master devices from gaining enough bandwidth) or too little bandwidth (thus affecting the rate at which the master device 4 can process data). In the present technique, the allocated amount of bandwidth is controlled by regulating the number of outstanding transactions corresponding to a particular master device 4 that reside within a transaction queue 12. At any instant in time the transaction queue 12 maintains an integer number of outstanding transactions ready for servicing by one of the slave devices 6. However, over a period of time a fractional number of outstanding transactions can be achieved by varying the number of outstanding transactions within the transaction queue 12 such that over time a time averaged number of outstanding transaction requests is a fractional number N.x. By controlling the rate at which transaction requests are issued to the bus system 8, the average number of outstanding transaction requests can be controlled to correspond to a specified target N.x.

Figure 4:
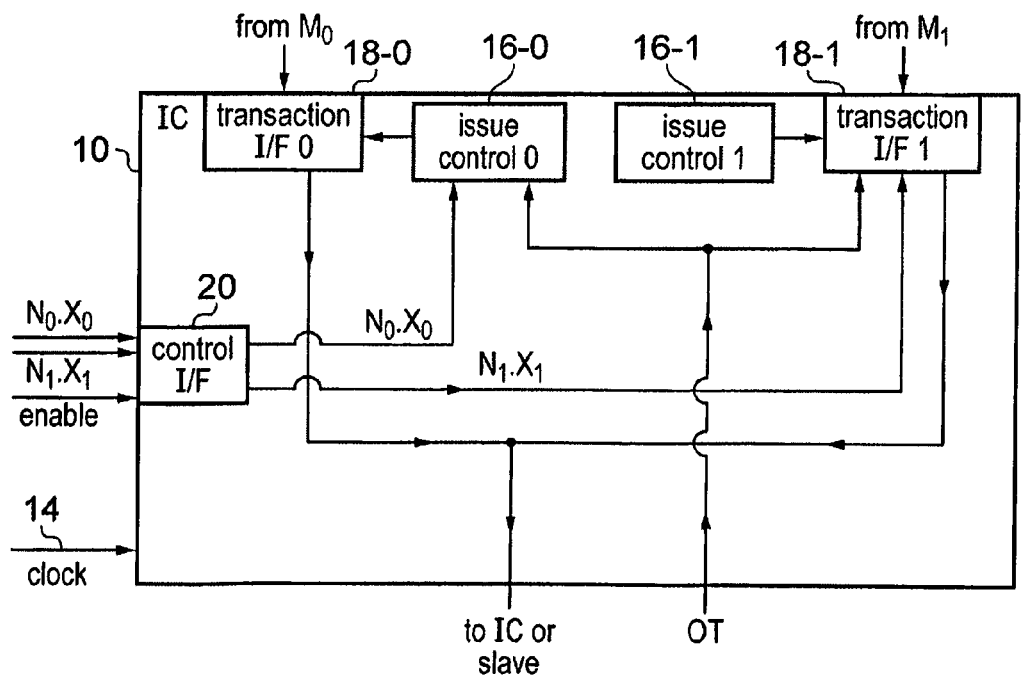
FIG. 4 schematically illustrates an embodiment of an interconnect comprising issue control circuits for controlling issuing of transaction requests from a master device to a bus system.

FIG. 4 schematically illustrates an example embodiment of an interconnect 10 comprising issue control circuitry 16 for controlling the issuing of transaction requests to the bus system 8. The interconnect 10 is clocked by a clock signal 14 and comprises at least one transaction interface 18 for receiving transaction requests from a corresponding master device $M_0$, $M_1$. The master devices $M_0$, $M_1$ could be master devices 4 as shown in FIG. 1 or, if the interconnect 10 of FIG. 4 is a lower level interconnect 10-1 within a bus system hierarchy, could be an interconnect 10-0 at a higher level in the hierarchy The transaction interface 18 receives a transaction request from the master device and selectively issues the transaction request to the bus system 8, from where the transaction request can be forwarded to a further interconnect 10 or to a slave device 6 coupled to the interconnect 10. The issue control circuit 16 controls whether or not the transaction interface 18 is allowed to issue a received transaction request.

The issue control circuit 16 determines whether or not to allow the transaction interface 18 to issue the transaction request in dependence on a current number of outstanding transactions OT received from within the bus system 8 and a target outstanding transaction value N.x received at a control interface 20. The current number of outstanding transactions OT is monitored by a part of the bus system 8 having a queue 12 or is received from a slave device 6 having a queue 12 and is passed up through the bus system to the issue control circuit 16. The target outstanding transaction value N.x may be received from an external device 11 or from one of the master devices 4 and may be reprogrammable during operation of the apparatus 2 to change the target. The target outstanding transaction value has an integer portion N and a fractional portion x. The issue control circuit 16 responds to the target N.x and the current number of outstanding transactions OT to control the transaction interface 18 to issue the transaction request to the bus system at a variable rate to regulate the time averaged number of outstanding transaction requests so that it corresponds to the target outstanding transaction value N.x.

While FIG. 4 illustrates the interconnect 10 having two transaction interfaces 18-0, 18-1, each having a corresponding issue control circuit 16-0, 16-1 for controlling the rate of issuing transaction requests from the corresponding master device, it will be appreciated that more transaction interfaces 18 may be provided and some transaction interfaces 18 may not be provided with a corresponding issue control circuit 16. Also, if desired the issue control circuit 16 may be provided externally from the interconnect 10 rather than within the interconnect 10.

Figure 5:
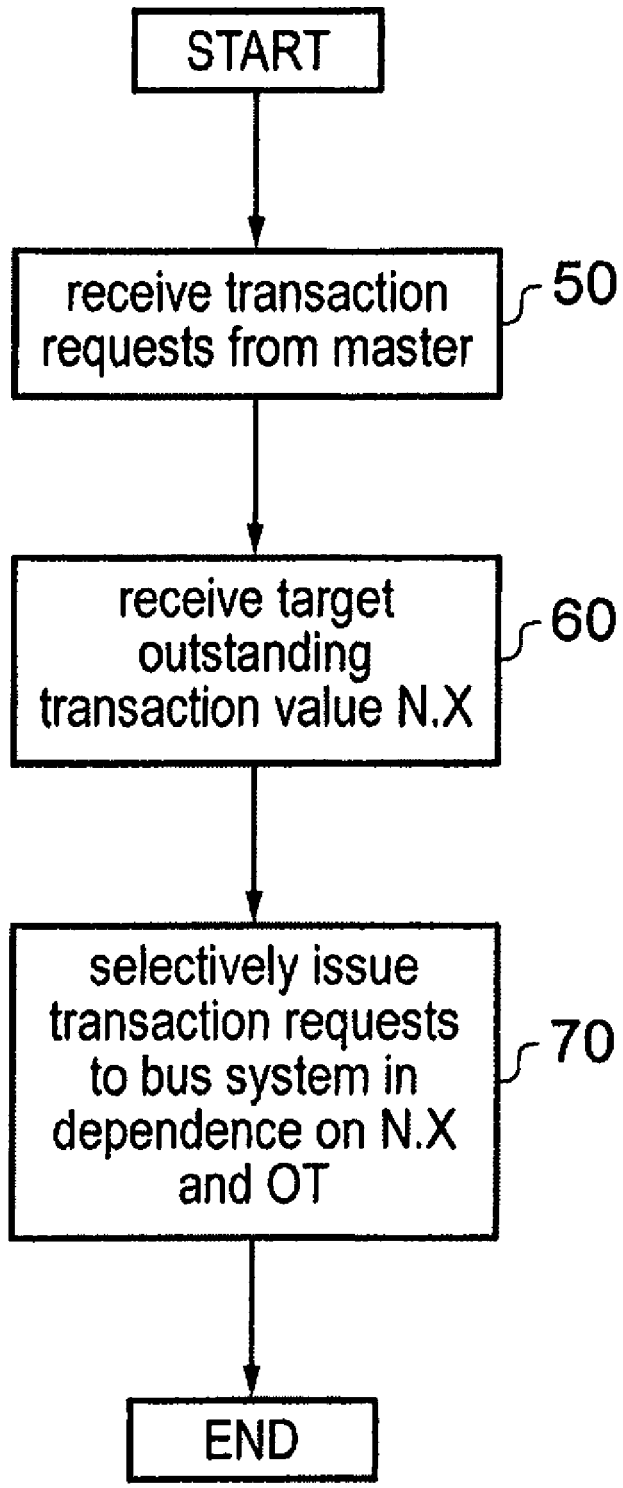
FIG. 5 illustrates a method of controlling issuing of transaction requests.

FIG. 5 illustrates a method controlling the issuing of transaction requests. At step 50 transaction requests are received from a master device. At step 60 a target outstanding transaction value N.x is received at a control interface from a master device 4 or an external device 11. At step 70, the issue control circuit 16 selectively controls the transaction interface 18 to issue transaction requests to the bus system 8 in dependence on the target outstanding transaction value N.x and the current number of outstanding transaction requests OT that are pending within a transaction queue 12. The target outstanding transaction value N.x may have a fractional value so that the issue control circuit varies the rate at which transaction requests are issued to the bus system to make the time averaged number of outstanding transaction requests correspond to the fractional value.

Figure 6:
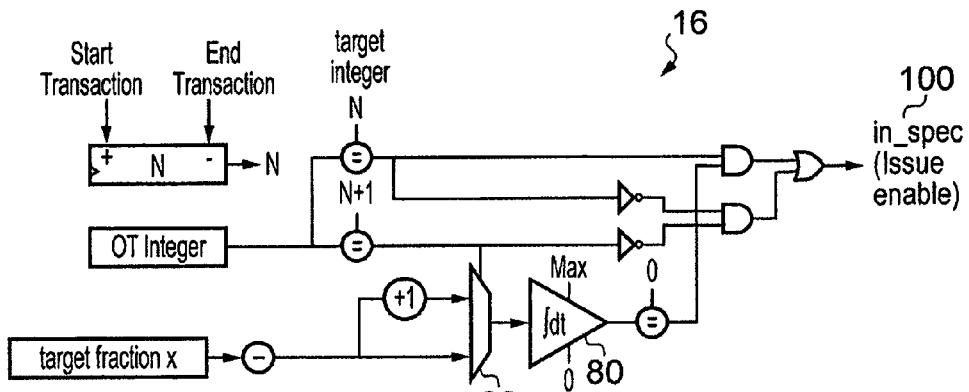
FIG. 6 schematically illustrates an example of issue control logic for controlling issuing of transaction requests so as to regulate the time averaged number of outstanding transaction requests.

FIG. 6 schematically illustrates an example of logic comprised by an issue control circuit 16 for controlling issuing of transaction requests. The issue control circuit includes a dual slope integrator (also known as an accumulator) 80 which maintains an accumulation value which is incremented or decremented by an amount per processing cycle depending on a comparison between the current number of outstanding transactions OT and N, the integer portion of the target outstanding transaction value N.x. The accumulator 80 increments the accumulation value by 1−x (that is, the binary inversion of the fraction x) for processing cycles in which there are greater than N outstanding transaction requests, and decrements the accumulation value by x for processing cycles where there are N or fewer outstanding transaction requests. To improve processing efficiency, both increment and decrement values are calculated and are selected by a multiplexer 90 which is controlled in dependence upon a comparison between the current number of outstanding transactions OT and the target integer N. The accumulation value is updated based on the value selected by the multiplexer 90. The accumulation value is not permitted to go below zero.

An issue enable signal 100 is generated in dependence upon the current number of outstanding transactions OT and the accumulation value maintained by the integrator 80. The issue enable signal 100 is provided to the transaction interface 18 to control whether or not the transaction interface 18 is allowed to issue an additional transaction request to the bus system 8. In the example embodiment of FIG. 6, when the issue signal 100 has a logic high value then the transaction interface 18 associated with the issue control circuit 16 is controlled to issue a further transaction request to the bus system 8, while if the issue enable signal 100 has a logic low value then the transaction interface 18 is prevented from issuing a further transaction request to the bus system. The issue enable signal 100 is controlled such that the transaction interface 18 issues a further transaction request when either the current number of outstanding transactions OT is fewer than N or the accumulation value maintained by the accumulator 80 is zero and the current number of outstanding transactions OT is equal to N. FIG. 6 shows a combination of logic gates for achieving such control of the issue enable signal 100.

Figure 7:
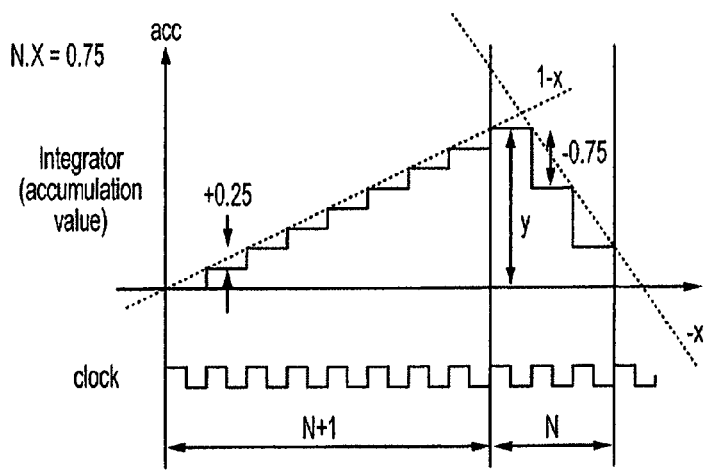
FIG. 7 schematically illustrates an example of the variation of an accumulation value and the number of outstanding transaction requests over an averaging cycle.
Figure 8:
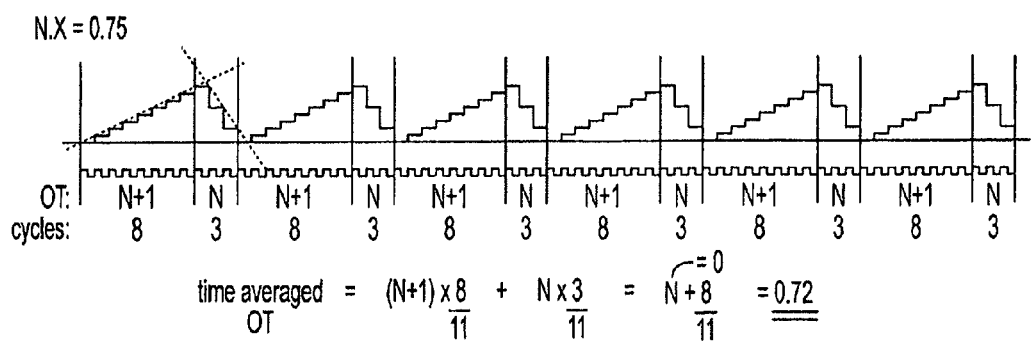
FIG. 8 schematically illustrates the example of FIG. 7 when repeated over several averaging cycles.

FIG. 7 shows why controlling the issue enable signal 100 in dependence on the accumulation value achieves a time averaged number of outstanding transactions corresponding to the target outstanding transaction value N.x. In the example of FIG. 7, the target outstanding transaction value is 0.75 (i.e. N=0 and x=0.75). While there are at least N+1 outstanding transaction requests (in this example, at least one outstanding transaction request) then the accumulation value maintained by the integrator 80 is incremented by 1−x per processing cycle (0.25 per cycle in this example). After several clock cycles then the outstanding transaction request is serviced and so the current number of outstanding transaction requests becomes N (zero in this example). For processing cycles in which there are N outstanding transaction requests, the accumulation value is decremented by x (0.75 in this example) per processing cycle until the accumulation value reaches 0. When the current number of outstanding transaction requests is N and the accumulation value equals zero then another transaction request is issued to the bus system 8 and so the current number of outstanding transaction requests increases again to N+1. Hence, the cycle shown in FIG. 7 starts again and repeats a number of times as shown in FIG. 8. In each cycle, the fraction of the cycle during which the current number of outstanding transaction requests is N+1 or N depends on the fractional portion x of the target outstanding transaction value. For example, in FIGS. 7 and 8 the current number of outstanding transactions OT is N+1 for eight out of every eleven clock cycles and the current number of outstanding transaction requests OT is N for three out of every eleven clock cycles. Hence, the time averaged number of outstanding transactions is 0.72, as shown in FIG. 8. This approximates to the target outstanding transaction value of 0.75.

This technique works because the accumulation value is incremented by a total amount y (2.0 in the example of FIG. 7) dependent on the length of time for which the N+1$^{th}$ outstanding transaction was pending, and so the number of cycles required to decrement the accumulation value from y to zero, during which there are N outstanding transactions, will be varied accordingly. If the N+1$^{th}$ outstanding transaction take a long time to be serviced then the accumulation value takes more cycles to be decremented to 0 and so the period during which there are N outstanding transactions is increased accordingly. Similarly, if the N+1$^{th}$ outstanding transaction takes few cycles to be serviced then the accumulation value is incremented by few steps and so the accumulation value is also decremented in few steps and so again the durations of the periods during which there are N+1 outstanding transactions and N outstanding transactions have the ratio determined by the target fractional outstanding transaction value.

In the embodiment of FIGS. 6 to 8, the accumulation value is incremented by adding 1−x to the accumulation value and is decremented by subtracting x from the accumulated value. However, these could also be reversed such that the accumulation value is incremented by subtracting (1−x) from the accumulation value and is decremented by adding x to the accumulation value. In this case, the issuing of an additional transaction request would be triggered when the accumulation value is decremented to zero (approaches zero from a negative value). Moreover, corresponding multiples of 1−x and x can be used as the increment or decrement amount if desired (e.g. the fractions x and 1−x could be multiplied by a constant to convert them into integers so as to simplify the configuration of the accumulator). Also, the threshold value for triggering issuing of transaction requests may be a non-zero value if desired.

As shown above, the technique shown in FIGS. 6 to 8 results in a time averaged outstanding transaction value which approximates well to the target outstanding transaction value. While there is a small discrepancy due to the finite step sizes of the increments and decrements, these rounding errors become less significant as the inter-transaction time increases.

Figure 9:
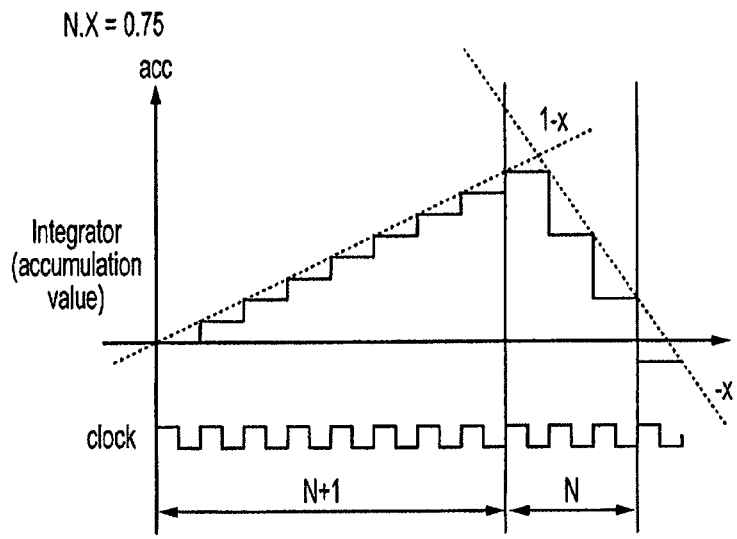
FIG. 9 illustrates an example of the variation of the accumulation value over time, in which the accumulation value is permitted to become negative for one processing cycle.
Figure 10:
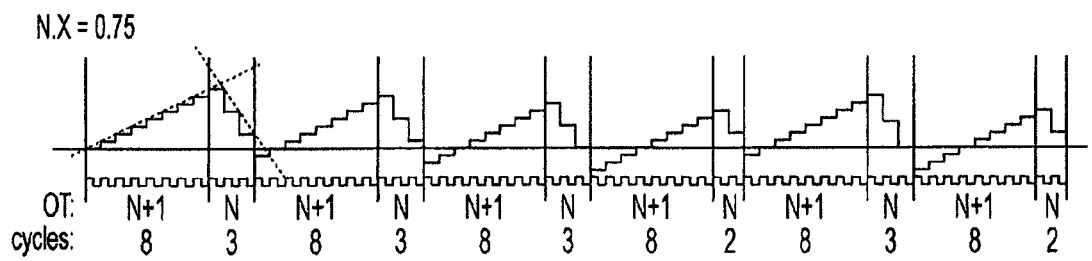
FIG. 10 illustrates the example of FIG. 9 when repeated several times.

FIGS. 9 and 10 show a technique of improving the accuracy with which the time averaged number of outstanding transaction requests corresponds to the target outstanding transaction value N.x. As for FIGS. 6 to 8, the examples of FIGS. 9 and 10 also use a target outstanding transaction value N.x of 0.75. In the example of FIGS. 9 and 10, the accumulation value is not capped at zero and is permitted to go beyond the threshold of zero for one processing cycle. The issue control circuit 16 permits the transaction interface 18 to issue an additional transaction request if either the number of outstanding transaction requests is fewer than N, or there are N outstanding transaction requests and the accumulation value is 0 or negative. Once the accumulation value has been decremented beyond zero then it is held at its decremented value and is prevented from being decremented any further. When another transaction request is issued so as to change the number of outstanding transactions to N+1, then the accumulation value is incremented by 1−x per clock cycle from its previous decremented position.

FIG. 10 shows the variation of the accumulation value over time, where the accumulator value is incremented when the number of outstanding transactions is N+1 and decremented when the number of outstanding transaction requests is N. By allowing the accumulation value to become negative, the errors caused by the finite step sizes cancel out over time. This is shown in FIG. 10, where the lowest decremented value of the accumulation value varies between successive repetitions of incrementing and decrementing. In this example, allowing the accumulation value to become negative causes the period during which there are N outstanding transactions to vary between two and three clock periods, and this causes the time averaged number of outstanding transactions to tend to exactly 0.75, as shown in FIG. 10.

Figure 11:
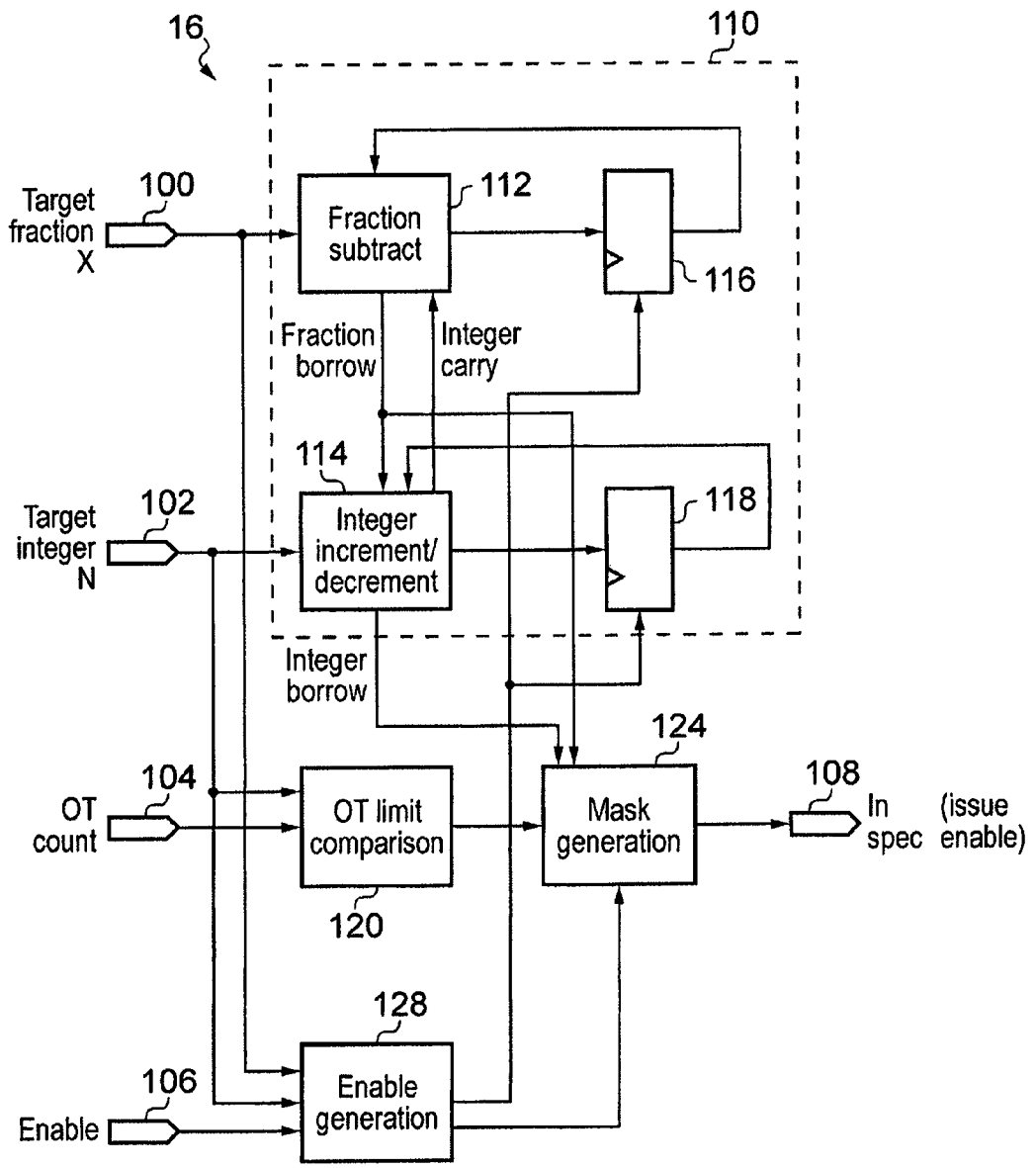
FIG. 11 illustrates example logic of an issue control circuit for controlling the time averaged number of outstanding transaction requests to correspond to a target outstanding transaction value having an integer portion N and a fractional portion x.

FIG. 11 shows an example of logic comprised by an issue control circuit 16 for implementing the technique shown in FIGS. 9 and 10. The issue control circuit 16 has a target fraction input 100 for receiving a fractional portion x of the target outstanding transaction value from the control interface 20, a target integer input 102 for receiving the integer portion N of the target outstanding transaction value from the control interface 20, an outstanding transaction input 104 for receiving from the bus system 8 the current number of outstanding transaction requests OT pending within a transaction queue 12, and an enable input 106 for receiving an enable signal. The issue control circuit 16 generates an issue enable signal which is output to the transaction interface 18 over an issue enable output 108 to selectively control the transaction interface 18 to issue an additional transaction request or prevent issue of a transaction request.

The issue control circuit 16 comprises an accumulator 110 comprising a fractional accumulator 112 and an integer accumulator 114. By separating the accumulator 110 into a fractional part and an integer part, the synthesis timings of the circuit can be improved. The fractional accumulator 112 stores the fractional part of the accumulation value in a data store 116. Similarly, the integer accumulator 114 stores the integer part of the accumulation value in a data store 118. Data stores 116, 118 may be, for example, registers or sets of flip-flops or latches.

Whilst the accumulation value is not negative, the fractional accumulator 112 decrements the fractional part of the accumulation value by x per clock cycle. Otherwise, the fractional part of the accumulation value stored in the data store 116 keeps its previous value.

Whilst there are greater than N outstanding transactions (usually this will be N+1 outstanding transactions) and there is no borrow from the fractional part of the accumulation value, the integer part of the accumulation value is incremented by 1 by the integer accumulator 114. Whilst there are N or fewer outstanding transactions (usually, this will be N outstanding transactions) or there is a borrow from the fractional part of the accumulation value, and the accumulation value is not negative, the integer part of the accumulation value is decremented by 1. In any other condition, the integer part of the accumulation value keeps its previous value.

The accumulation value is allowed to go negative for one step before further decrements are prevented. This ensures that discrepancies between the time averaged number of outstanding transactions and the target value N.x cancel out over time and so errors do not accumulate over time.

Limit comparison logic 120 is provided for comparing the target integer N with the current number of outstanding transaction requests OT. Mask generation logic 124 is responsive to the current value of the accumulation value and the comparison performed by the limit comparison logic 120. The mask generation logic 124 places the issue enable signal in a state that causes the transaction interface 18 to issue an additional transaction request if one of the following criteria is satisfied: (i) the number of outstanding transaction requests is fewer than N; or (ii) the number of outstanding transaction requests is N and the accumulation value is zero or negative. When neither of these criteria are satisfied, then the mask generation logic 124 places the issue enable signal in a state that controls the transaction interface 18 to prevent an additional transaction request being issued to the bus system 8.

The accumulator 110 is disabled whenever the fractional part x of the target value is zero, since in this case the comparison between the target integer N and the current number of outstanding transactions OT is sufficient for controlling the issuing of transaction requests. In this case, the mask generation logic 124 controls the transaction interface 18 to issue an additional transaction request when the current number of outstanding transaction requests is fewer than N.

The issue control provided by the issue control circuit 16 may be disabled in response to an enable signal received at the enable interface 106 being in a disable state. Enable generation logic 128 is provided for controlling whether or not issue control is enabled or not. When the enable signal received at the enable interface 106 indicates that issue control is to be disabled, then the mask generation logic 124 drives the issue enable output 108 with the issue enable signal in the state which indicates that issuing of transaction requests by the transaction interface 18 is allowed. Hence, the transaction interface 18 issues transaction requests at a rate independent of the target N.x. For example, the transaction interface 18 can issue the transaction requests as soon as they are received from the master device. In a similar way, the enable generation logic 128 may also disable issue control by the issue control circuit 16 if the integer part N and the fractional part x of the target are both set to zero.

Figure 12:
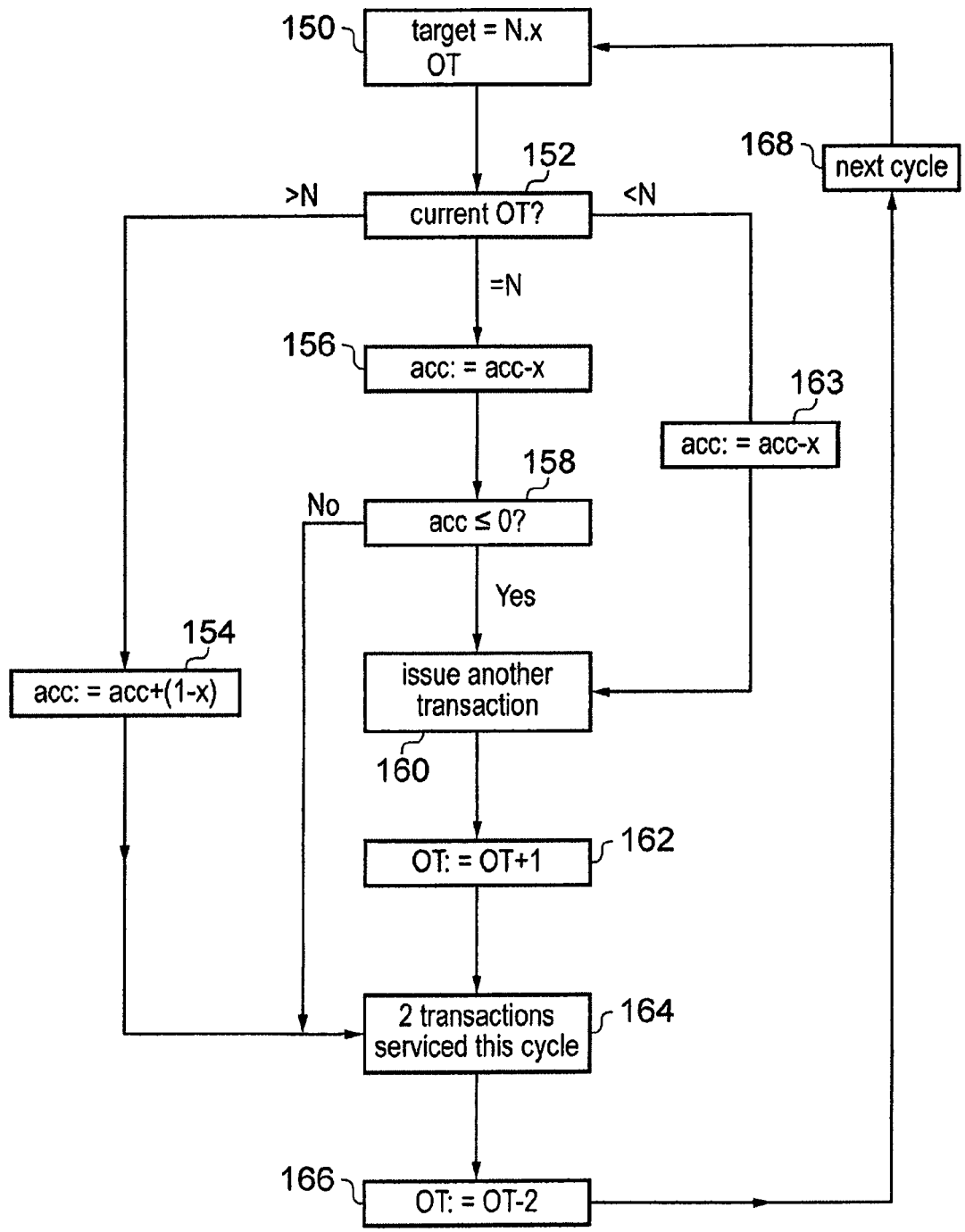
FIG. 12 illustrates a method of controlling the issuing of transaction requests in dependence upon a target outstanding transaction value, an accumulation value and a current number of outstanding transaction requests.

FIG. 12 illustrates a method of controlling the issuing of transaction requests in dependence on an accumulation value and a current number of outstanding transaction requests. At step 150 the target number of outstanding transaction requests N.x is received from the control interface 20. At step 152, the current number of outstanding transaction requests is determined. If the current number of outstanding transactions is greater than N then the method proceeds to step 154 where the current value of the accumulation value is incremented by 1−x. On most occasions then if the current number of outstanding transactions is greater than N then the current number of outstanding transactions will equal N+1. However, on some occasions, for example if the target outstanding transaction value N.x has recently been reprogrammed, or the issue control has previously been disabled and is now enabled again, then the current number of outstanding transactions can be greater than N+1.

If at step 152 the current number of outstanding transaction requests is equal to N then the method proceeds to step 156 where the accumulation value is decremented by x. At step 158, the issue control circuit 16 determines whether the accumulation value is less than or equal to 0. If the accumulation value is less than or equal to 0 then at step 160 the issue control circuit 16 generates an issue enable signal controlling the transaction interface 18 to issue another transaction request to the bus system 8. At step 162 then the current number of outstanding transaction requests is incremented by 1. On the other hand, if at step 158 the accumulation value was greater than 0 then steps 160 and 162 are omitted.

If at step 152 the current number of outstanding transactions is fewer than N, then the method proceeds to step 163 where the accumulation value is decremented by x. Then, at step 160 an additional transaction request is issued to the bus system by the transaction interface 18 under control of the issue control circuit 16. At step 162, the current number of outstanding transactions is incremented by 1. The current number of outstanding transaction requests should rarely go below N, but may do if, for example, no new transaction requests are generated for a period by the master device 4 or the target outstanding transaction value has recently been reprogrammed.

Regardless of the current number of outstanding transactions at step 152 and whether or not the accumulation value is less or equal to 0 at step 158, the method then proceeds to step 164 at which it is determined whether any transactions have been serviced in this processing cycle. If there are Z transactions that have been serviced in this processing cycle then at step 166 the number of current outstanding transaction requests is reduced by Z. At step 168 the system then proceeds to the next clock cycle.

The method then returns to step 150 where the target number of outstanding transaction requests N.x is determined once more (the target could have been reprogrammed by a master device 4 or by an external device 11). The method then loops through steps 150 to 168 in the same way as described above. When the target outstanding transacting value N.x is reprogrammed then there will be a short period during which the time averaged number of outstanding transaction requests does not correspond to the target outstanding transaction value. During this period, the method shown in FIG. 12 will gradually shift the time averaged number of outstanding transactions towards the new target. Once this transitional period is over then the time averaged number of outstanding transaction requests 10 tends towards the new target outstanding transaction value.

If at any point the processing of the apparatus 2 is halted then the method of FIG. 12 ends.

Figure 13:
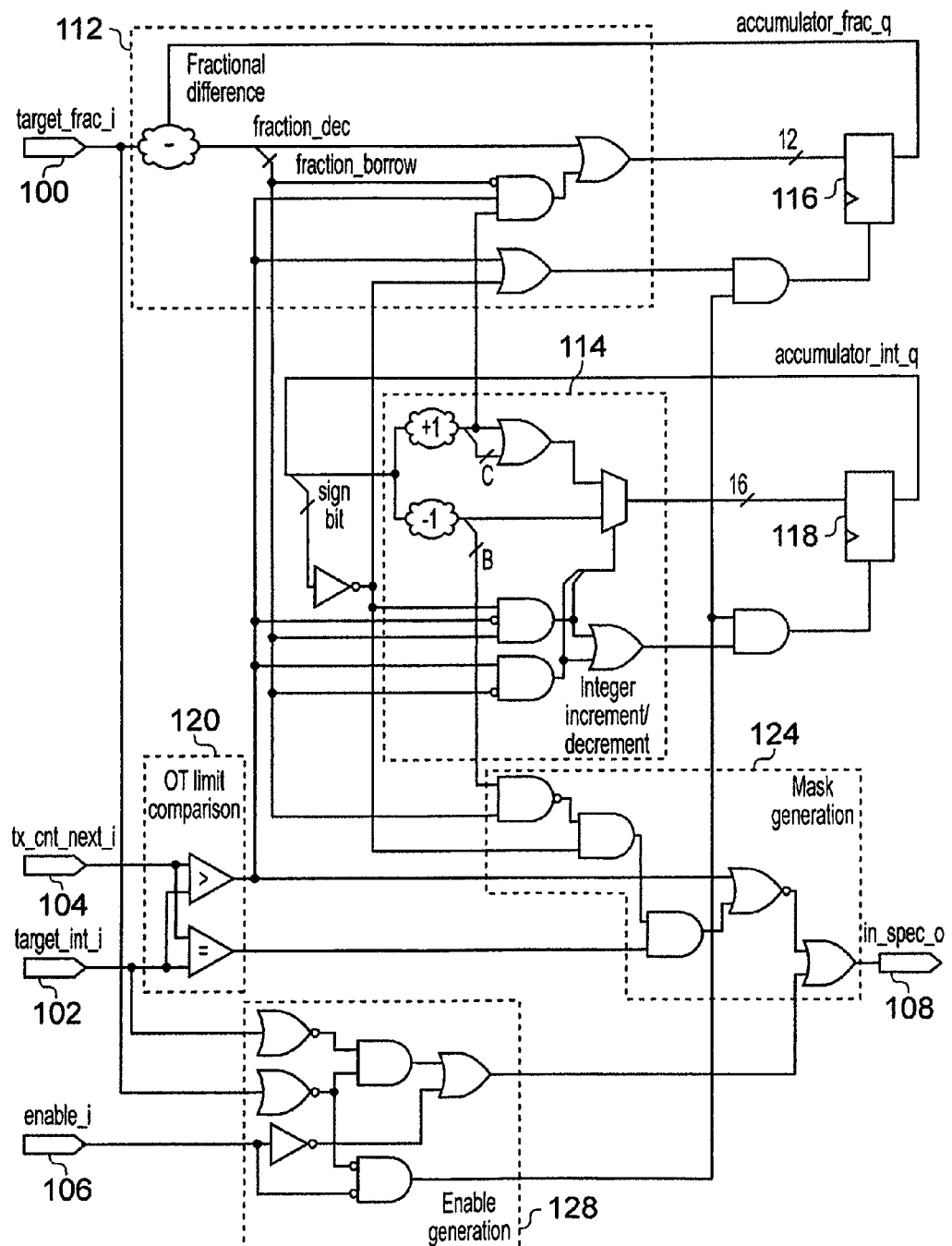
FIG. 13 illustrates an example embodiment of circuitry for implementing an issue control circuit.

FIG. 13 schematically illustrates an example embodiment of logic for implementing the issue control circuit illustrated in FIG. 11. The features of FIG. 13 that correspond to features of FIG. 11 have been illustrated with the same reference numerals as the corresponding feature in FIG. 11.

The fractional accumulator 112 calculates a signed difference of the current fractional part of the accumulation value less the fractional part x of the target value. If the result of the integer computation overflows, the fractional result is saturated positive. The result is stored to the accumulator, if it is enabled. If the accumulator is disabled then the accumulation value retains its previous value.

Incremented and decremented versions of the integer accumulator are produced in parallel by the integer accumulator 114. The incremented version has saturation to prevent it rolling over negative. One or other of the incremented and decremented values is selected according to the current number of outstanding transactions OT and the sign of the fractional difference. The result becomes the updated accumulation value, if the accumulator is enabled. Calculating an incremented version of the accumulation value and decremented version of the accumulated value in parallel in this way helps to improve the circuit timings and speed up the calculation of the accumulation value.

The fractional accumulator 112 and integer accumulator 114 are disabled if the integer target N and fractional target x are both zero, the fractional part x is zero, or the enable signal is placed in a disable state (by de-asserting the enable signal).

The limit comparison logic 120 uses an equality check to determine if the current number of outstanding transactions is equal to N, and a greater than comparison to determine if the current number of outstanding transactions is greater than N. Generally the current number of outstanding transactions will rarely go beyond N+1, but the greater than comparison is preferable to an equality check between N+1 and the current number of outstanding transaction requests since this prevents issues in cases when the current number of outstanding transaction requests could be higher than N+1, e.g. where the target has reprogrammed, or issue control has been disabled.

The mask generation logic 124 uses the output of the limit comparison logic 120 and information about the current state of the accumulation value to determine when to permit new transactions to start. The mask generation logic 124 indicates that a new transaction can be issued by asserting its in_spec_o (issue enable) output 108. When issue control is enabled, the mask generation logic 124 asserts the issue enable output 108 when there are fewer than N outstanding transaction requests, or there are N outstanding transaction requests and the accumulation value is zero or negative. When the outstanding transaction monitor is disabled by de-assertion of the enable input 106 or by setting both the integer and fractional parts of the target to zero, the mask generation logic 124 always permits new transactions to start.

Figure 14:
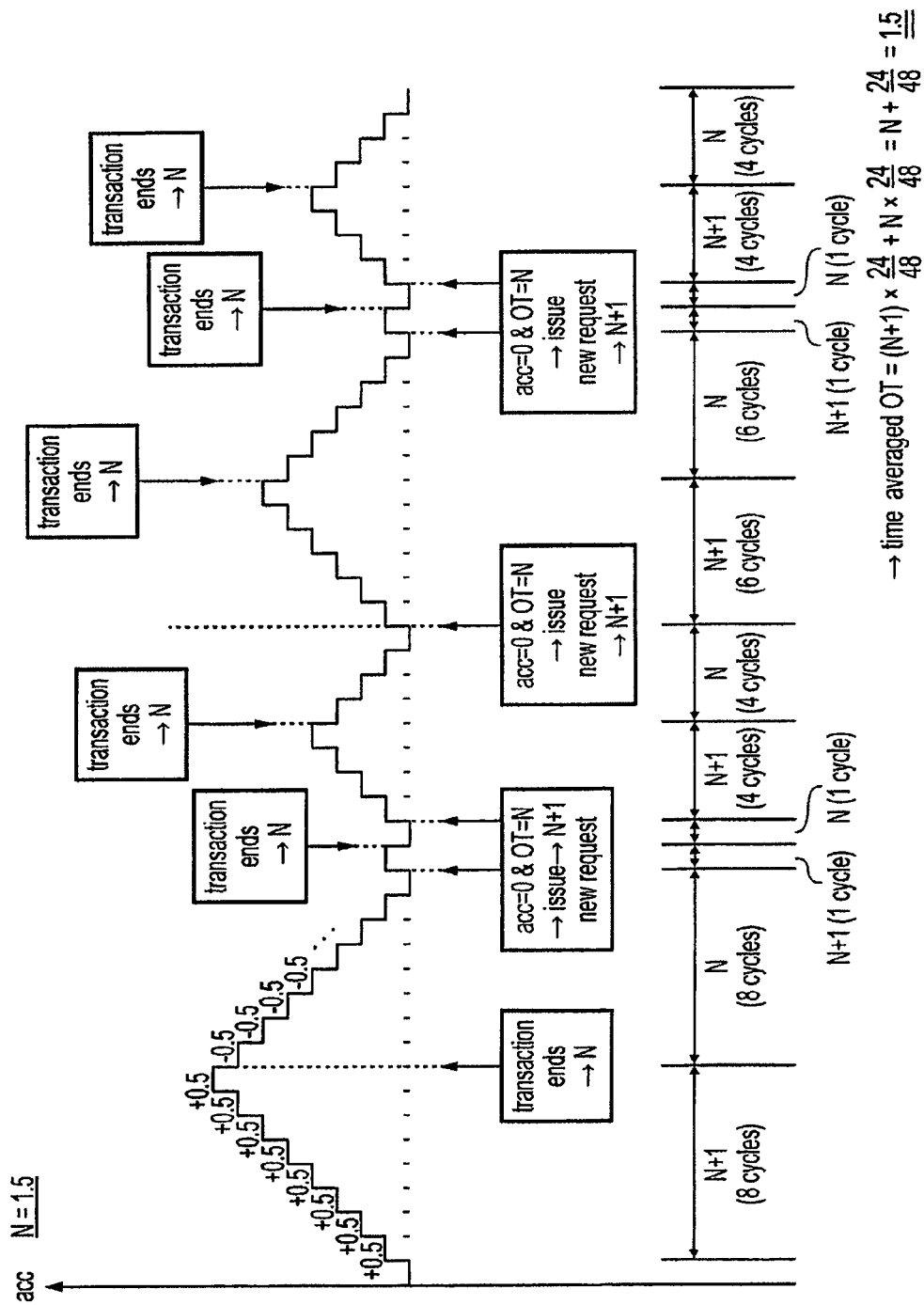
FIG. 14 illustrates an example of controlling the issuing of transaction requests so that a time averaged number of outstanding transaction requests corresponds to a target of 1.5.

FIG. 14 illustrates an example of the use of the present technique to regulate the number of outstanding transaction requests to a fractional value on average. FIG. 14 shows an example in which a series of transaction requests take different lengths of time to service. For each clock cycle in which there are N+1 outstanding transaction requests, the accumulation value is incremented by 1−x, while for each clock cycle in which there are N outstanding transaction requests the accumulation value is decremented by x. In the example of FIG. 14, the target value is 1.5 and so in this example the increment and decrement steps are both equal to 0.5.

FIG. 14 shows that however long it takes to service the N+1$^{th}$ transaction request, the length of time for which there are N transaction requests is adjusted accordingly so as to average to the target outstanding transaction value. This is because the greater the number of clock cycles during which there are N+1 outstanding transaction requests, the higher the accumulation value at the point where the number of outstanding transaction requests becomes N, and so the greater the number of clock cycles required to decrement the accumulation value to zero.

Figure 15:
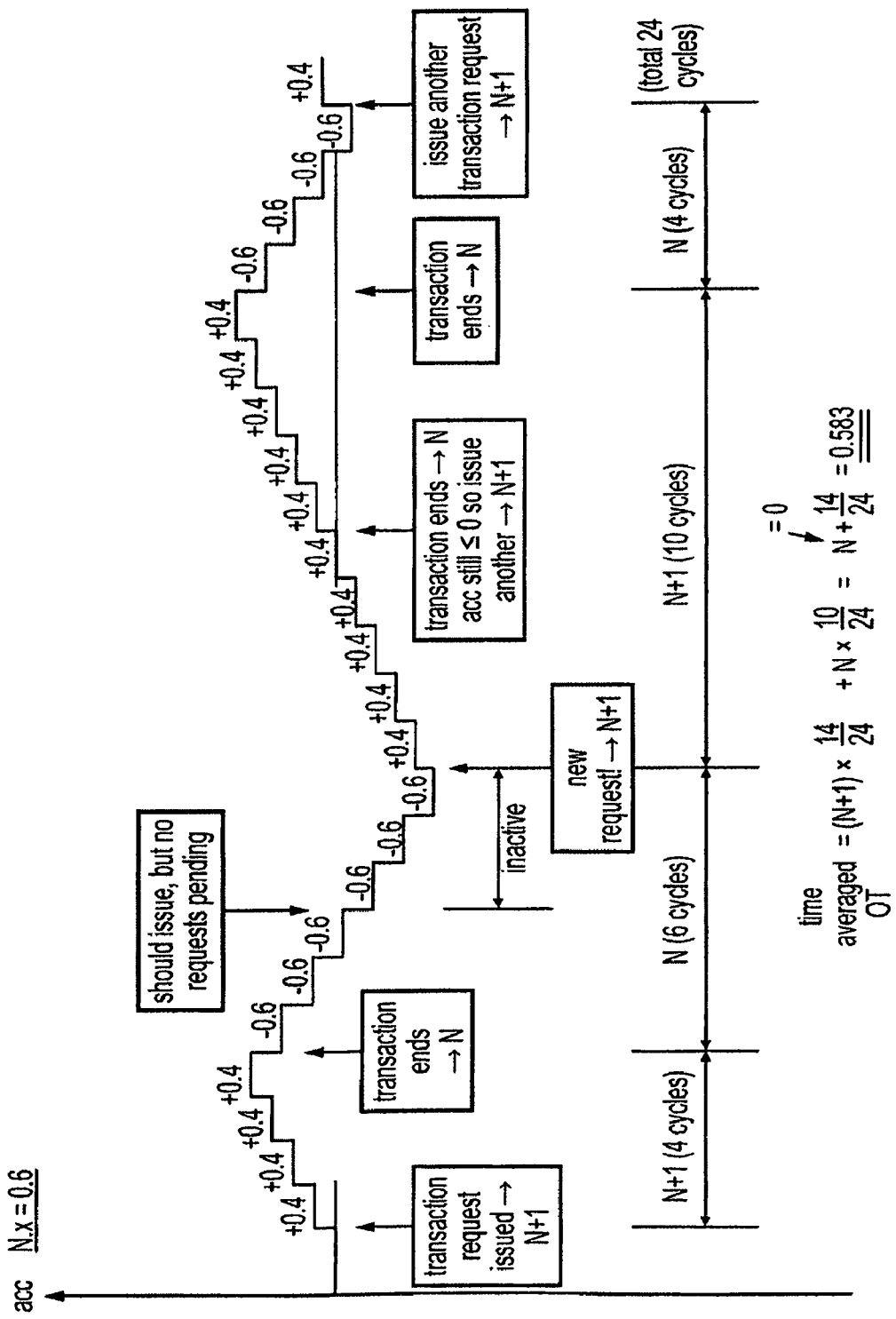
FIG. 15 illustrates another example of controlling the issuing of transaction requests in which the accumulation value is permitted to be decremented beyond the threshold value and continue being decremented until a further transaction request is generated.

In the examples of FIGS. 9-14, the accumulation value has been capped so that it can be decremented for one step beyond the threshold of zero but is held at that decremented value for a period until a new transaction request is issued to the bus system. However, it is not essential to prevent the accumulation value from being decremented further. FIG. 15 shows an example in which the accumulation value continues to be decremented after passing the threshold of zero until a new request is generated.

In the example of FIG. 15, the target outstanding transaction value is 0.6. Thus, for cycles in which there are more than N outstanding transaction requests then the accumulation value is incremented by 1−0.6=0.4 per processing cycle. When the current number of outstanding transaction requests is N or fewer then the accumulation value is decremented by x=0.6 per processing cycle.

For example, in FIG. 15 there are N+1 outstanding transaction requests for the first four cycles and so the accumulation value is incremented by 0.4 per processing cycle. Then, there are N outstanding transaction requests and so the accumulation value is decremented by 0.6 per processing cycle.

After three more processing cycles, the accumulation value is decremented beyond the threshold of zero. At this point, the accumulation value is negative and there are N outstanding transaction requests and so normally an additional transaction request would be issued to increase the number of outstanding transaction requests N+1. However, if there are no transaction requests pending from a particular master device, then the transaction interface 18 cannot issue any further transaction requests from the master device and so the number of outstanding transaction requests may remain at N. Hence, the accumulation value continues to be decremented by 0.6 per cycle until a new request is available. Since the accumulation value is negative, the new request is then issued to raise the current number of outstanding transaction requests to N+1. The accumulation value is then incremented and processed as before.

Figure 16:
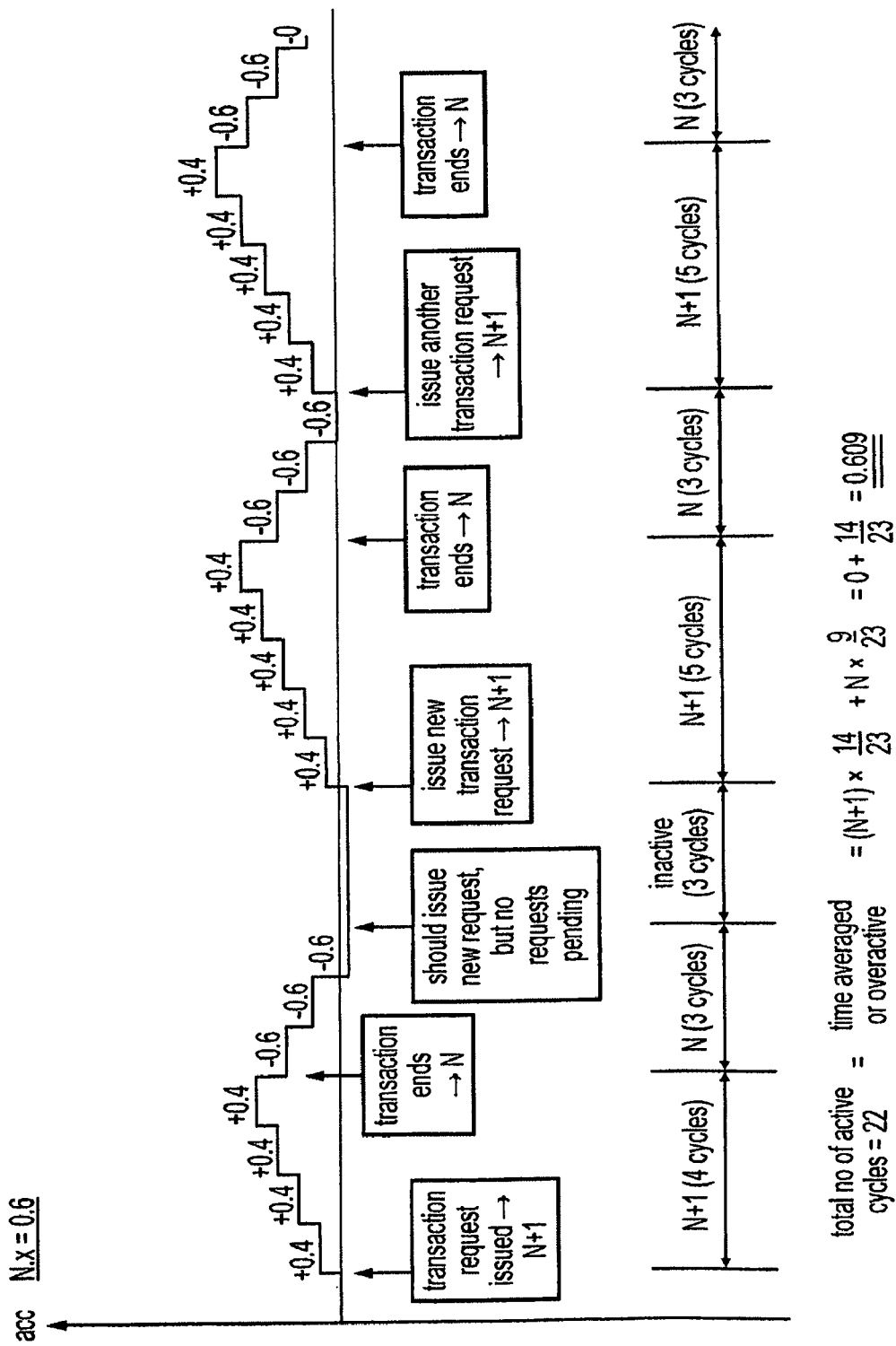
FIG. 16 shows an example for comparison with the example of FIG. 15 in which the accumulation value is permitted to be decremented for one step beyond the threshold value.

In the examples of FIGS. 9-14, the accumulation value would have been capped at the decremented value achieved when the accumulation value first crosses the threshold with zero. This is shown in FIG. 16, where the accumulation value is decremented beyond zero and then held at the decremented value while there are no requests pending. When a new transaction request becomes available then the request is issued and so the accumulation value is then incremented from the capped decremented value.

Note that the time averaged number of outstanding transaction requests in FIG. 15 is different to the time averaged number of outstanding transaction requests in FIG. 16. This is because in FIG. 15 the accumulation value continues to be decremented while there were no requests pending, and so the time averaged outstanding transaction value is calculated over the entire processing time (including the period during which no new transaction requests were generated by the master device).

In contrast in FIG. 16 the accumulation value was held at a fixed value during the period when the master device was inactive and there were no further transaction requests to issue. Therefore, in the example of FIG. 16 the time averaged outstanding transaction value is averaged only over the cycles during which the master device was active. Hence, by selecting whether or not the accumulated value is capped at one decrement below zero (as in FIG. 16) or is allowed to continue being decremented (as in FIG. 15), the control circuit 16 can control the issue rate so that the time averaged outstanding transaction value is averaged over all time or over the active time, as desired.

Figure 17:
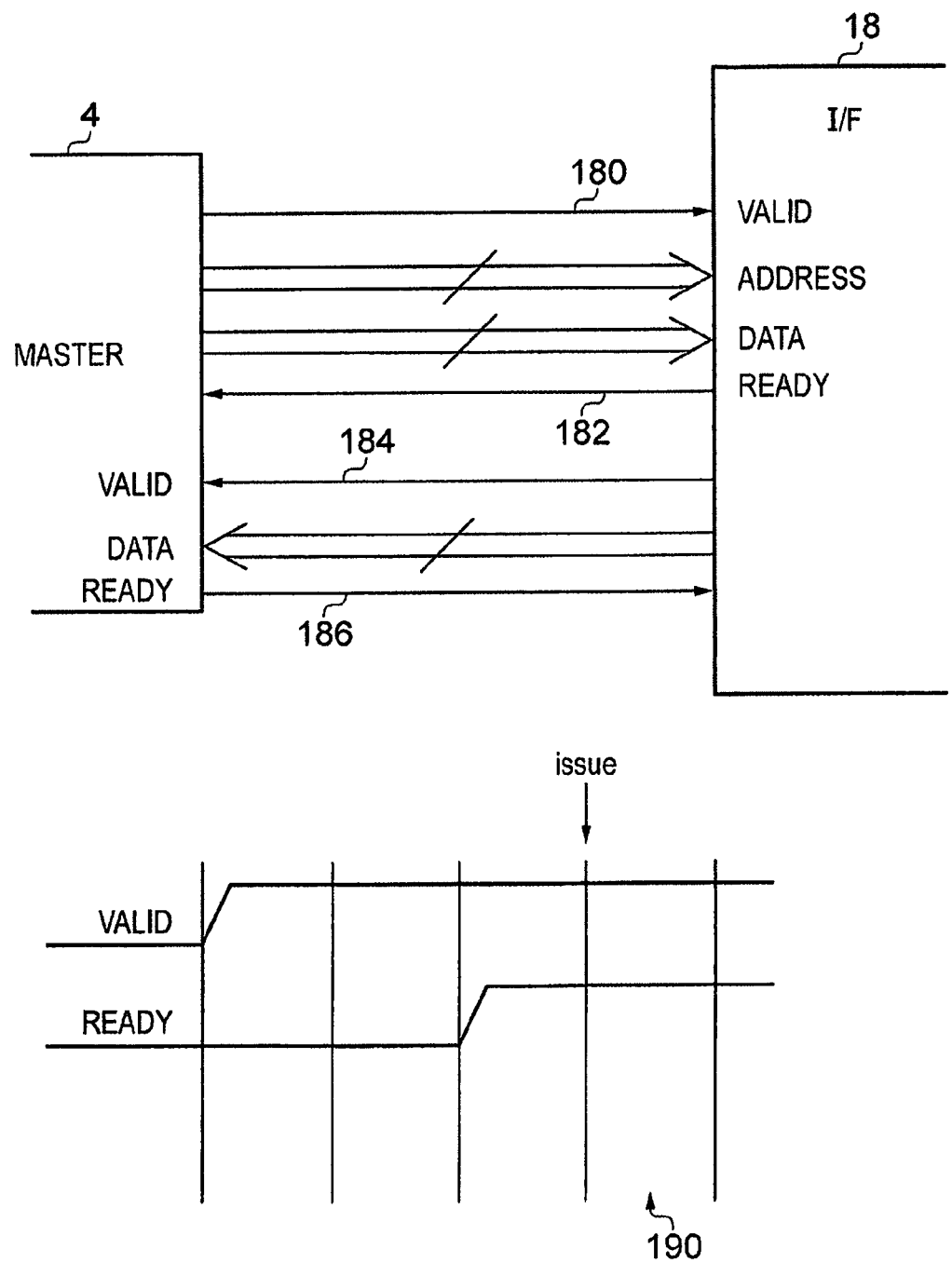
FIG. 17 illustrates an example embodiment of an interface between the master device and a bus system.

FIG. 17 shows an example embodiment of the communication between a master device 4 and the transaction interface 18. When the master device 4 generates the new transaction request, then the master device 4 asserts a valid signal 180 and provides any data and address required for the transaction request to the interface 18. When the transaction interface 18 is ready to accept the transaction request then the transaction interface 18 asserts a ready signal 182. The transaction interface 18 issues the transaction request to the bus system 8 in a processing cycle 190 where both the valid signal 180 and the ready signal 182 are asserted at the beginning of the cycle (see FIG. 17).

Similarly, when a response to a transaction request arrives over the bus system 8 for delivery to the master device 4, then the transaction interface 18 asserts a valid signal 184. When the master device 4 is ready to receive the response then it asserts a ready signal 186. The transaction interface 18 delivers the response and any data required to the master device 4 when both the valid signal 184 and ready signal 186 are asserted.

In an example embodiment, the transaction interface 18 may be arranged to assert its ready signal 182 when it receives the issue enable signal 100 from the issue control circuit 16 indicating that an additional transaction request may be issued to the bus system 8. Hence, the issue control circuit 16 can control when the transaction interface 18 accepts the transaction request and issues the transaction request to the bus system 8.

In the above examples, a transaction interface 18 has been provided with a single issue control circuit 16 for regulating the rate at which transaction requests are issued to the bus system in order to correspond to the target outstanding transaction value. However, in the embodiment shown in FIG. 18, a single transaction interface 18 may be provided with multiple issue control circuits 16 for controlling the rate at which transaction requests of different types are issued. A master device 4 can issue transaction requests of different types to the transaction interface 18 together with an identifier identifying the type of the issued transaction request. Respective target outstanding transaction values $N_0.x_0$, $N1.x_1$, $N_2.x_2$ can be provided to the respective issue control circuits 16 to control the issuing of the different types of transaction requests. For example, if the master device 4 is a graphics processor performing different kinds of graphics processing requiring different amounts of bandwidth, then transaction requests relating to these different kinds of processing can be provided with different type identifiers and different target outstanding transaction values reflecting the different bandwidth requirements of these types of transaction requests. Hence, a type of transaction request which does not require much bus bandwidth is not unnecessarily allocated a large amount of bandwidth, whilst a type of transaction request from the same master device that requires a higher rate of bandwidth can still receive its required allocation.

Figure 18:
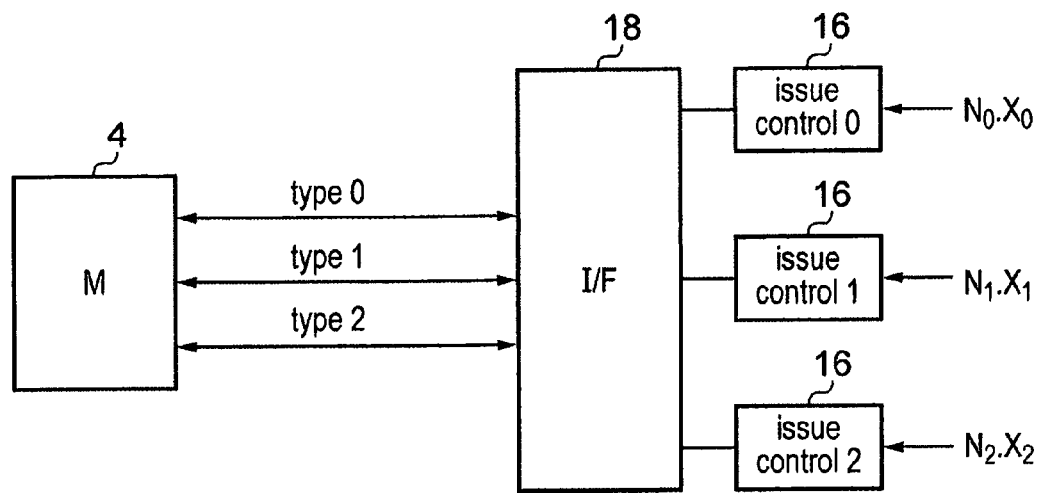
FIG. 18 illustrates an example embodiment of providing independent issue control for different types of transaction request.
Figure 19:
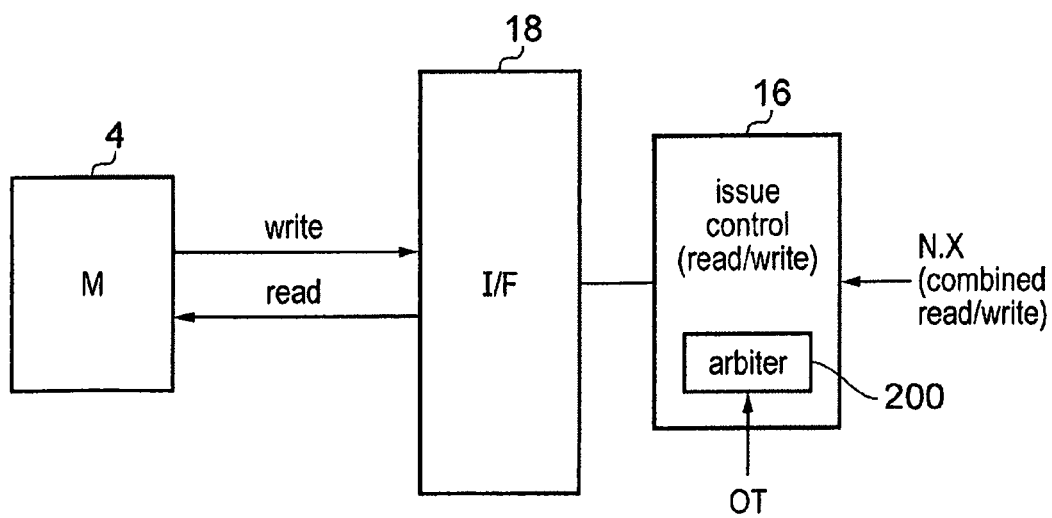
FIG. 19 schematically illustrates an example embodiment in which combined issue control is provided for read transaction requests and write transaction requests.

In FIG. 18, it would be possible to treat write transaction requests and read transaction requests as different types and to provide separate issue control circuits 16 for managing the respective types of transaction request. However, in an embodiment shown in FIG. 19, the write transaction requests and read transaction requests are managed in a combined manner using a combined issue control circuit 16. The issue control circuit 16 receives a combined read/write target outstanding transaction value N.x which is used to control the rate at which read or write transaction requests are issued to the bus system by the transaction interface 18 so that the time averaged number of combined read and write outstanding transaction requests corresponds to the target. When the current number of outstanding transaction requests OT is N−1, then one transaction request should be issued to raise the current number of outstanding transaction requests to N. However, there may be both write transaction requests and read transaction requests awaiting issue. Hence, an arbiter 200 may be provided within the issue control circuit to detect when the current number of outstanding transactions is N−1 and in this case to arbitrate between any pending writes and read transaction requests according to a predetermined arbitration criterion. The selected transaction request is then issued to the bus system 8. While in FIG. 19 the arbiter 200 is shown as part of the issue control circuit 16 it may also be provided in another location such as within the interconnect 10 or the transaction interface 18.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for controlling issuing of transaction requests to a bus system, said apparatus comprising:
   a transaction interface configured to receive said transaction requests from a master device and to selectively issue said transaction requests to said bus system, said transaction requests requesting a service from a slave device, an outstanding transaction request being a transaction request that has been issued to said bus system and is awaiting servicing by said slave device;
   a control interface configured to receive a target outstanding transaction value N.x having an integer portion N and a fractional portion x; and
   an issue control circuit configured to control said transaction interface to issue said transaction requests to said bus system in dependence on said target outstanding transaction value such that a time averaged number of outstanding transaction requests corresponds to said target outstanding transaction value N.x.

2. The apparatus according to claim 1, wherein said time averaged number of outstanding transaction requests is time averaged over an active period during which said master device is generating transaction requests.

3. The apparatus according to claim 1, wherein said time averaged number of outstanding transaction requests is time averaged over an operation time of said bus system independently of whether said master device is generating transaction requests.

4. The apparatus according to claim 1, wherein said time averaged number of outstanding transaction requests is time averaged over an averaging cycle which repeats over time, and said issue control circuit controls said transaction interface to issue said transaction requests such that a current number of outstanding transaction requests is N+1 for a fraction x of said averaging cycle and said current number of outstanding transaction requests is N for a fraction 1−x of said averaging cycle.

5. The apparatus according to claim 1, wherein said issue control circuitry comprises an accumulator configured to accumulate an accumulation value in dependence on a current number of outstanding transaction requests and said target outstanding transaction value N.x; and
   said issue control circuit is configured to issue said transaction requests in dependence on said accumulation value and said current number of outstanding transaction requests.

6. The apparatus according to claim 5, wherein said apparatus and said bus system are clocked with a clock signal defining processing cycles;
   said accumulator is configured to increment said accumulation value by an amount proportional to 1−x for a processing cycle when said current number of outstanding transaction requests is greater than N;
   said accumulator is configured to decrement said accumulation value by an amount proportional to x for a processing cycle when said current number of outstanding transaction requests is equal to, or fewer than, N; and
   said issue control circuit is configured to control said transaction interface to issue an additional transaction request to said bus system when: (a) said current number of outstanding transaction requests is fewer than N; or (b) said current number of outstanding transaction requests is N and said accumulation value is one of: (i) decremented beyond a predetermined threshold value and (ii) equal to said predetermined threshold value.

7. The apparatus according to claim 6, wherein said predetermined threshold value is zero.

8. The apparatus according to claim 6, wherein said accumulator is configured to prevent said accumulation value being decremented beyond said predetermined threshold value.

9. The apparatus according to claim 6 wherein said accumulator is configured to allow said accumulation value to be decremented beyond said predetermined threshold for one processing cycle, and to prevent said accumulation value being decremented in processing cycles following said one processing cycle until after said accumulation value has been incremented beyond said predetermined threshold.

10. The apparatus according to claim 6, wherein said accumulator is configured to allow said accumulation value to be decremented beyond said predetermined threshold and to continue allowing said accumulation value to be decremented in following processing cycles when said current number of outstanding transaction requests continues to be equal to, or fewer than, N.

11. The apparatus according to claim 6, wherein said accumulator is configured to generate both an incremented accumulation value and a decremented accumulation value in a same processing cycle; and
   said accumulator is configured to update the accumulation value to be equal to one of said incremented accumulation value and said decremented accumulation value selected in dependence on said current number of outstanding transaction requests.

12. The apparatus according to claim 6, wherein when said fractional portion x of said target outstanding transaction value has a value of zero, said issue control circuit is configured to disable said accumulator and to control said transaction interface to issue an additional transaction request to said bus system when said current number of outstanding transaction requests is fewer than N.

13. The apparatus according to claim 5, wherein said accumulator comprises an integer accumulator for accumulating an integer portion of said accumulation value and a fractional accumulator for accumulating a fractional portion of said accumulation value.

14. The apparatus according to claim 1, comprising an enable interface for receiving an enable signal;
   wherein said issue control circuit is responsive to said enable signal being in an enable state to control said transaction interface to issue transaction requests to said bus system in dependence on said target outstanding transaction value; and
   said issue control circuit is responsive to said enable signal being in a disable state to control said transaction interface to issue transaction requests to said bus system independently of said target outstanding transaction value.

15. The apparatus according to claim 1, wherein said transaction requests comprise a plurality of types of transaction requests;
   said control interface is configured to receive a plurality of target outstanding transaction values N.x for said plurality of said types of transaction requests; and
   said issue control circuit is configured to control said transaction interface to issue said transaction requests in dependence on said respective plurality of target outstanding transaction values such that a time averaged number of outstanding transaction requests for a type of transaction requests corresponds to the target outstanding transaction value N.x for said type.

16. The apparatus according to claim 1, wherein said transaction requests comprise read transaction requests and write transaction requests, and said target outstanding transaction value is a combined target outstanding transaction value indicating a target for a combined number of outstanding read transaction requests and outstanding write transaction requests.

17. The apparatus according to claim 16, wherein said issue control circuit comprises an arbiter responsive to a current number of outstanding transaction requests being equal to N−1 to select one of a pending read transaction request and a pending write transaction request for issue to said bus system.

18. The apparatus according to claim 1, comprising a plurality of transaction interfaces configured to receive transaction requests from a corresponding plurality of master devices and to selectively issue said transaction requests to said bus system; wherein:
said control interface is configured to receive a plurality of target outstanding transaction values N.x for said plurality of master devices; and
said apparatus comprises a plurality of issue control circuits configured to control said plurality of transaction interfaces to issue transaction requests in dependence on said respective plurality of target outstanding transaction values such that the time averaged number of outstanding transaction requests for a master device corresponds to the target outstanding transaction value N.x for said master device.

19. The apparatus according to claim 1, wherein said apparatus is part of an interconnect within said bus system.

20. The apparatus according to claim 1, wherein said target outstanding transaction value is reprogrammable by at least one of said master device and an external device.

21. An apparatus comprising:
a plurality of master devices configured to generate transaction requests;
at least one slave device configured to perform a service in response to said transaction requests;
a bus system coupled to said plurality of master devices and said at least one slave device, at least one of said bus system and said at least one slave device comprising at least one transaction queue for queuing outstanding transaction requests, an outstanding transaction request being a transaction request that has been issued to said bus system and is awaiting servicing by said at least one slave device;
a plurality of transaction interfaces each configured to receive said transaction requests from a corresponding one of said master devices and to selectively issue said transaction requests to said bus system;
a control interface configured to receive at least one target outstanding transaction value N.x for at least one master device, said target outstanding transaction value having an integer portion N and a fractional portion x; and
at least one issue control circuit configured to control at least one of said transaction interfaces to issue said transaction requests to said bus system in dependence on said at least one target outstanding transaction value such that a time averaged number of outstanding transaction requests for said at least one master device corresponds to said target outstanding transaction value N.x for said at least one master device.

22. An apparatus for controlling issuing of transaction requests to a bus system means, said apparatus comprising:
transaction interface means for receiving said transaction requests from a master device means and for selectively issuing said transaction requests to said bus system means, said transaction requests requesting a service from a slave device means, an outstanding transaction request being a transaction request that has been issued to said bus system means and is awaiting servicing by said slave device means;
control interface means for receiving a target outstanding transaction value N.x having an integer portion N and a fractional portion x; and
issue control means for controlling said transaction interface to issue said transaction requests to said bus system means in dependence on said target outstanding transaction value such that a time averaged number of outstanding transaction requests corresponds to said target outstanding transaction value N.x.

23. An apparatus comprising:
a plurality of master device means for generating transaction requests;
at least one slave device means for performing a service in response to said transaction requests;
bus system means, coupled to said plurality of master device means and said at least one slave device means, for transferring said transaction requests from said master device means to said slave device means, at least one of said bus system means and said at least one slave device means comprising at least one transaction queue means for queuing outstanding transaction requests, an outstanding transaction request being a transaction request that has been issued to said bus system means and is awaiting servicing by said at least one slave device means;
a plurality of transaction interface means for receiving said transaction requests from a corresponding one of said master device means and to selectively issue said transaction requests to said bus system means;
control interface means for receiving at least one target outstanding transaction value N.x for at least one master device means, said target outstanding transaction value having an integer portion N and a fractional portion x; and
at least one issue control means for controlling at least one of said transaction interface means to issue said transaction requests to said bus system means in dependence on said at least one target outstanding transaction value such that a time averaged number of outstanding transaction requests for said at least one master device means corresponds to said target outstanding transaction value N.x for said at least one master device means.

24. A method for controlling issuing of transaction requests to a bus system, said method comprising:
receiving transaction requests from a master device for issue to said bus system, said transaction requests requesting a service from a slave device, an outstanding transaction request being a transaction request that has been issued to said bus system and is awaiting servicing by said slave device;
receiving a target outstanding transaction value N.x having an integer portion N and a fractional portion x; and
selectively issuing said transaction requests to said bus system in dependence on said target outstanding transaction value such that a time averaged number of outstanding transaction requests corresponds to said target transaction value N.x.

* * * * *